United States Patent
Barry et al.

(10) Patent No.: US 7,099,027 B1
(45) Date of Patent: Aug. 29, 2006

(54) METHOD AND APPARATUS FOR DISTRIBUTING PRINT JOBS

(75) Inventors: Michael Barry, Daluth, GA (US); Jeffrey Pitts Dockman, Suwanee, GA (US); Kevin John O'Neill, Jr., Alpharetta, GA (US); Robert Gregory Pennington, Lawrenceville, GA (US); Michael David Raines, Daluth, GA (US); Matthew David Shumaker, Lawrenceville, GA (US); Elliot Neal Tompkins, Atlanta, GA (US)

(73) Assignee: Electronics for Imaging, Inc., Forster City, CA (US)

( * ) Notice: Subject to any disclaimer, the term of this patent is extended or adjusted under 35 U.S.C. 154(b) by 969 days.

(21) Appl. No.: 09/861,021

(22) Filed: May 18, 2001

Related U.S. Application Data

(63) Continuation-in-part of application No. 09/438,228, filed on Nov. 12, 1999.

(51) Int. Cl.
*G06K 15/00* (2006.01)

(52) U.S. Cl. ............................ 358/1.15; 358/1.2
(58) Field of Classification Search ............. 358/1.15, 358/101, 1.2, 1.13, 528; 709/247, 246, 250, 709/221, 230; 346/107.3
See application file for complete search history.

(56) References Cited

U.S. PATENT DOCUMENTS 6,198,920 B1 * 3/2001 Doviak et al. ............ 455/426.1
6,288,726 B1 * 9/2001 Ballard ..................... 345/468

* cited by examiner

*Primary Examiner*—Arthur G. Evans
(74) *Attorney, Agent, or Firm*—Howison & Arnott, L.L.P.

(57) ABSTRACT

Method and apparatus for distributing print jobs. A print job is generated at an application node of a network, and has associated therewith print parameters. The print job is routed to a distribution node on the network. The parameters are then parsed from the generated print job and the print job parameterized with predetermined metrics that are a function of at least one of the parsed parameters. The parameterized print job is then routed to a destination device on a destination node the network.

36 Claims, 15 Drawing Sheets

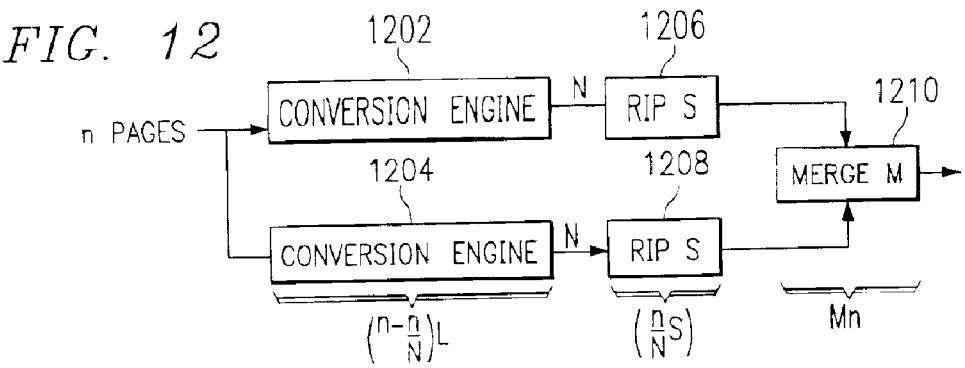
FIG. 12
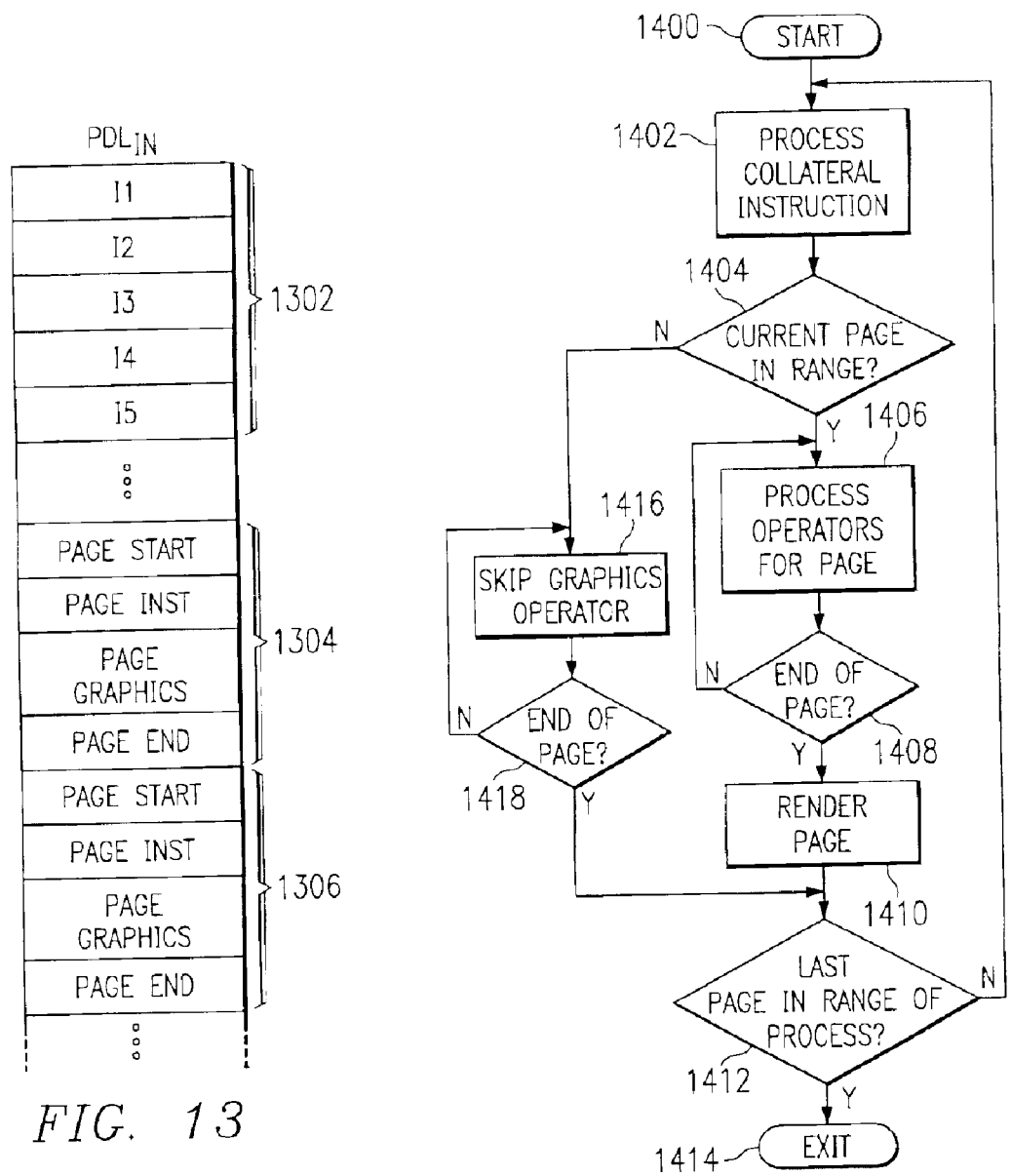
FIG. 13
FIG. 14

METHOD AND APPARATUS FOR DISTRIBUTING PRINT JOBS

CROSS REFERENCE TO RELATED APPLICATIONS

This application is a Continuation-in-Part of U.S. patent application Ser. No. 09/438,228, filed Nov. 12, 1999 (TRSY 24,726).

TECHNICAL FIELD OF THE INVENTION

The present invention pertains in general to printing systems and, more particularly, to a distribution system for distributing print jobs to one or more of a plurality of printers.

BACKGROUND OF THE INVENTION

In the area of multi-processing one of the ongoing challenges is to develop methods and workflows that lend themselves to efficient uses of parallel processing. Today one of the most popular methods for describing documents, especially for printed delivery, is the well known PostScript® produced by Adobe Systems Incorporated. PostScript® has many benefits and is almost universally employed in many print markets today. However, it has a limitation which creates a significant barrier to efficient parallel processing. That limitation is created by the fact that within a PostScript® file, the boundaries and content of individual pages is buried within the file and can only be determined by processing the PostScript® file in some manner to establish the page boundaries and content. One popular method to do this is to transform or convert a PostScript® file into a portable document format (PDF) file, typically referred to as a "distilling" operation. This allows the page boundaries in a multi-page job to be established and thus allows multiple interpreters to operate on the pages individually, thus facilitating parallel processing. However, if the object is to process a job faster, one must take into account the time necessary to convert from a page dependent format as in the PostScript® file to the desired page independent format as in a PDF file. This added conversion time will add to the overall time to complete the job.

SUMMARY OF THE INVENTION

The present invention disclosed and claimed herein, in one aspect thereof, comprises a method for processing print jobs. A print job is generated at an application node of a network, and has associated therewith print parameters. The print job is routed to a distribution node on the network. The parameters are then parsed from the generated print job and the print job parameterized with predetermined metrics that are a function of at least one of the parsed parameters. The parameterized print job is then routed to a destination device on a destination node on the network.

BRIEF DESCRIPTION OF THE DRAWINGS

For a more complete understanding of the present invention and the advantages thereof, reference is now made to the following description taken in conjunction with the accompanying Drawings in which:

FIG. 12 illustrates a block diagram of a simplified segmented RIP operation;

FIG. 13 illustrates a diagrammatic view of the $PDL_{IN}$ job in the PostScript® file format;

FIG. 14 illustrates a flowchart depicting the operation of processing through a PostScript® file;

DETAILED DESCRIPTION OF THE INVENTION

Figure 1A:
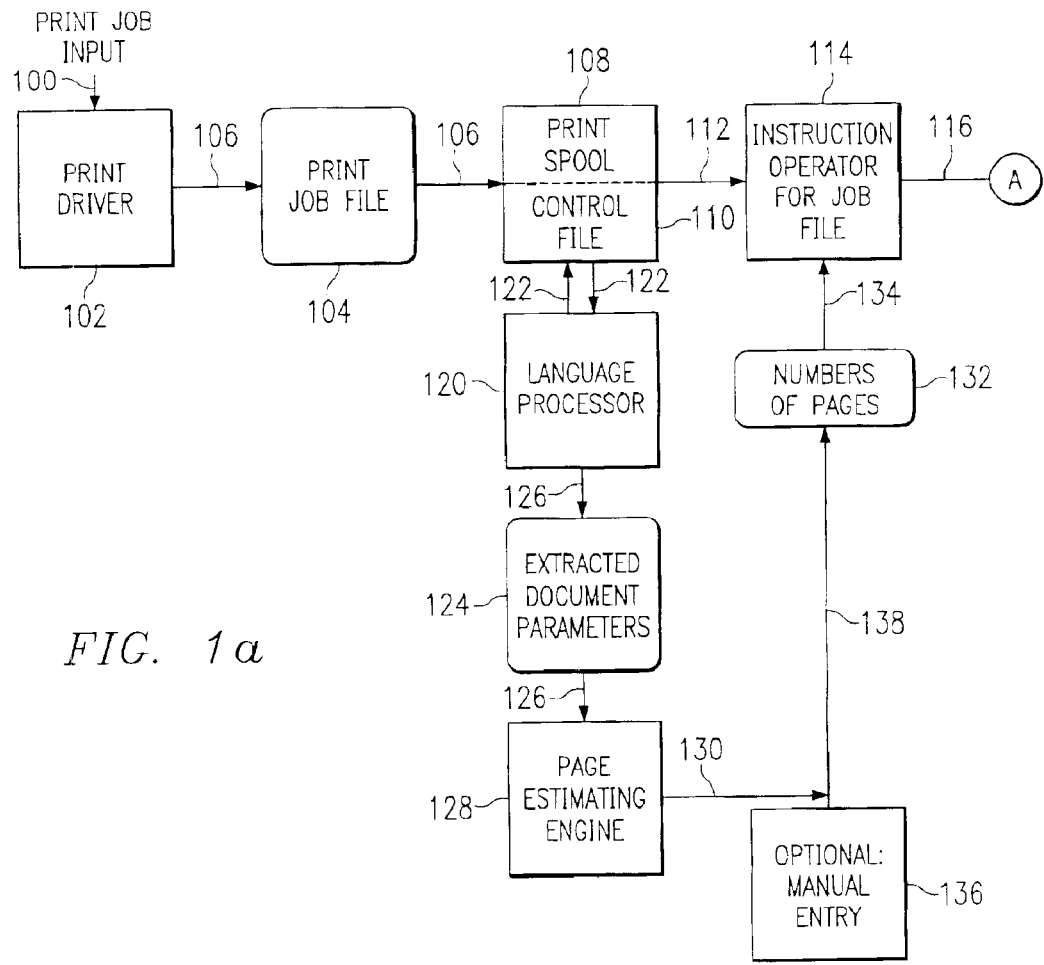
FIGS. 1a and 1b illustrate a block diagram for parallel conversion processing of large print jobs according to the present disclosure.
Figure 1B:
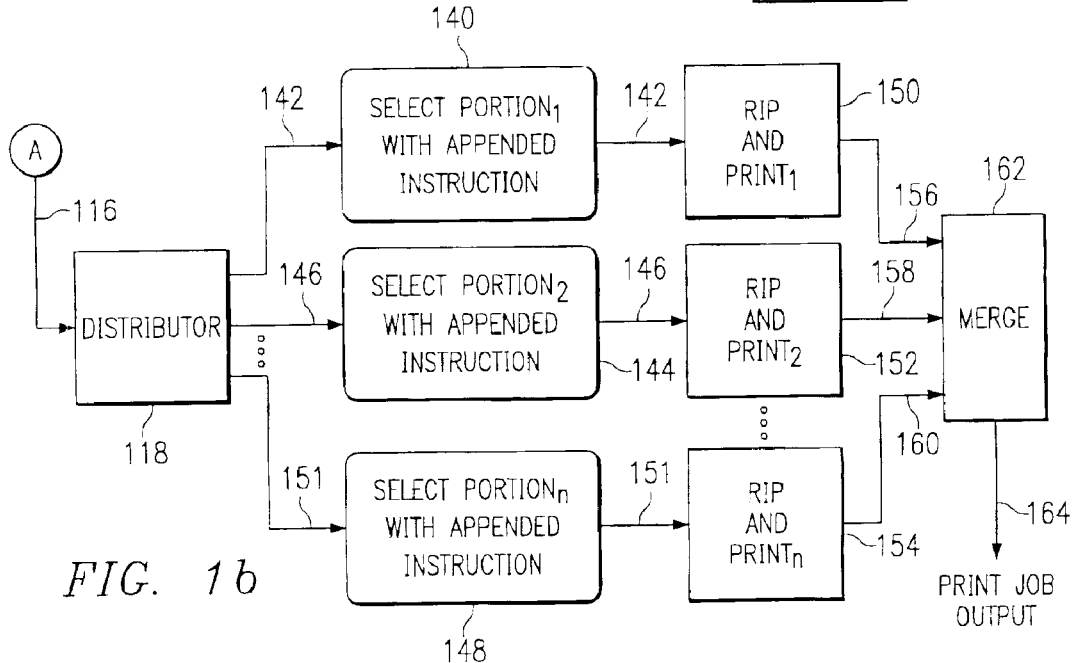

Referring now to FIGS. 1a and 1b, there is illustrated a block diagram of a system for performing multiple, parallel conversion processing for large print jobs. Conversion processing, by way of example, may include raster image processing (RIP). The print job input 100 is provided to a print driver 102 as a print job file 104 and is output from print driver 102 along a line 106 to a print spooler 108. Print spooler 108 includes a control file 110 for storing job control information. Control file 110 may be a storage location or it may be merely a temporary data file that travels with the print job file 104. The print spooler 108 represents storage for the print job file 104 wherein the print job file 104 may be made available along a path 112 to an instruction operator 114. Instruction operator 114 has an output along a line 116 to a distributor 118 in FIG. 1*b*.

Returning now to the print spooler 108 there is shown the control file 110 portion of printer spooler 108 which is coupled to a language processor 120 along a bidirectional data path 122. The language processor 120 provides for extracting specific information from the control file 110 which will be used in subsequent process control functions. The language processor 120 may take several forms depending on the application. The examples to be described herein are not intended to be limiting but merely illustrative. Other examples of structures for fulfilling the functions of the language processor 120 are possible, as will be apparent to persons skilled in the art. One example of a language processor 120 is a language monitor which is programmed to recognize specified document parameters as they are spooled into the system. Such functions may also be performed by a user mode driver or a user mode graphical user interface. All of these examples are readily adaptable in a typical operating system environment such as Windows NT® produced by Microsoft® Corporation. Another example, to be described hereinbelow, provides an estimating engine such as a page estimating engine 128 which forms a estimate of the total number of pages based on certain assumptions about the print job file, e.g., that it's a homogeneous document and based upon updates as the print job file is spooled into the system. As will also be described hereinbelow, the information provided by the language processor 120 and the page estimating engine 128 is used in partitioning the print job file into select portions, and also to preserve the document parameter information required to keep the print job file accessible by the processor(s) during subsequent parallel RIP operations.

The select portions mentioned hereinabove are processed in parallel to achieve greater throughput, improved workflow and greater efficiency through more logical function organization of the processes. For example, each select portion of the print job may be treated or processed differently during RIP as required by the application. Moreover, by making assumptions or a priori guesses about the print job document parameters, other advantages besides those mentioned hereinabove may be realized. For example, the delivery of very large print jobs nationwide such as daily and weekly periodicals may be greatly facilitated by partitioning the print job file according to the zip codes of the addressees for the documents. All addressees may thus receive their copy of the print job file as easily as possible and at approximately the same time. Other document parameters that may be used include the type of material—graphics, text, blank regions, color, monochrome, and the like. For the purposes of the illustrative example described herein, the total number of pages is a practical document parameter that is a relatively easy example to illustrate the principles of the present disclosure.

In the illustrative example shown in FIGS. 1*a* and 1*b*, the language processor 120 provides extracted document parameters 124 along a line 126 to a page estimating engine 128. The page estimating engine 128 provides an output along a line 130 consisting, for example, of the total number of pages 132 which is provided along a line 134 to the instruction operator 114. In this illustrative example, the language processor has extracted document parameter information necessary for estimating the total number of pages in the print job file and providing that information to the instruction operator 114 for use in processing the print job file which is contained in print spooler 108. This is also shown an optional manual entry block 136 that provides for manually entering the total number of pages along a line 138 and coupling therealong to lines 130 and 134 to provide the information about total number of pages 132 to instruction operator 114.

In operation, the language processor 120 obtains document parameter information from the control file 110 to be used by the instruction operator 114 in defining control parameters for accomplishing the parallel conversion processing of a print job in an efficient manner. In the illustrative example shown in FIGS. 1*a* and 1*b*, the language processor 120 extracts information about the total number of pages that are spooled into the print spooler 108, feeding it to the instruction operator 114. The instruction operator 114 uses this information, for example, the total number of pages, for partitioning the total print job into portions such that each portion may be processed in a parallel conversion processing configuration. That is, the total print job may be divided into portions, each portion of which is designated for processing on an associated selected RIP engine. Alternatively, the entire print job file is sent to, i.e., made accessible to, each of a plurality of conversion engines coupled in parallel to a common bus via distributor 116. As thus sent, each one of the print job files 104 includes an apportioned (select) segment, having part of the document file allocated for full conversion in the conversion engine receiving it, and a remaining segment having the rest of the document.

The language processor 120 is also capable of extracting other kinds of information that may be programmed into the system for control of subsequent processing operations upon the print job file 104. The instruction operator 114 has the capability of reading the function operators associated with the print job file and modifying certain of the operators used to control the processing of the print job file. Together, the language processor 120 and the instruction operator 114 operate to avoid having to otherwise convert the entire document file from e.g., a PDL format to a PDF format to obtain access to the page parameters and other information stored in the header that would be required to organize the print job file for processing through conversion and subsequent stages in a parallel system. For example if the print job file 104 was formatted in PostScript®, which is a well known page description language produced by Adobe Systems Incorporated, then the instruction operation 114 can read the PostScript® operators and modify those operators that are used in the processing or can substitute other operators or instructions in order to accomplish specific print system control features. The example given of estimating the total number of pages in the print job in order to partition the print job into portions for subsequent processing is just one example of the kinds of operations that may be performed in the system and method of the present disclosure shown in FIG. 1.

Continuing with FIGS. 1*a* and 1*b,* the distributor block 118 is provided to distribute in multiple print job files, each multiple thereof having a select portion of the print job which was segmented or partitioned by instruction operator 114 for processing according to separate processes in a plurality of parallel sections of the print system illustrated in FIGS. 1a and 1b. For example, distributor 118 provides the print job file 104 including a first select portion 140 along a line 142 to a first RIP engine 150. The first select portion 140 may include an appended instruction added by the instruction operator 114 which may represent a modified processing step or a substitute instruction for use by the first RIP engine 150 in processing the print job file. It will also be noticed that the first RIP engine 150 may include a first print engine associated with the first RIP engine 150. In other applications the first print engine may be separate from the first RIP engine 150. The output of first RIP engine 150 is provided along path 156 to an optional merge block 162 wherein the outputs of several RIP engines and/or print engines may be merged together to provide a combined print job output along path 164.

The outputs of the RIP engines 150–154 may be in different locations, such that a merge operation is not called for. Distributor 118 has several other outputs including an output for a print job file having a second select portion 114 which is coupled along path 146 from distributor 118 to a second RIP engine 152. Similarly a print job file having an nth select portion 148 is also coupled from distributor 118 along a path 151 to an nth RIP engine 154 representing the last partitioned print job file having a select portion of the print job to be separately processed in a parallel path. The output of the second RIP engine 152 and the nth RIP engine 154 are provided respectively along paths 158 and 160 to the merge block 162 for merging with other select portions of the print job which have been subject to conversion processing and printing by associated print engines, as shown in blocks 150, 152 and 154 corresponding to the respective RIP and/or print engines.

In operation, the select portions of the print job obtained by segmenting the print job file in block 114 are routed to separate, associated RIP engines by distributor 118, providing for, in this illustrative example, parallel conversion processing and printing prior to becoming merged together to complete the print job along path 164. The select portions, each of which represents less than all of the entire print file 104, are separately processed by the RIP engines 150, 152 and 154 according to substituted RIP instructions generated by the instruction operator 114 based on document parameters 124 extracted by a language processor 120. Further, the remaining portion of each print job file sent to a conversion engine 150, 152 or 154 may be processed according to modified instruction operators appended to the print job file. Operation of these features will be described in detail hereinbelow in conjunction with FIGS. 2a and 2b. The concept of "less than all of the entire print job," which is embedded in the segmenting or partitioning of the print job into select portions and remaining portions, will become clearer as the description proceeds.

Figure 2A:
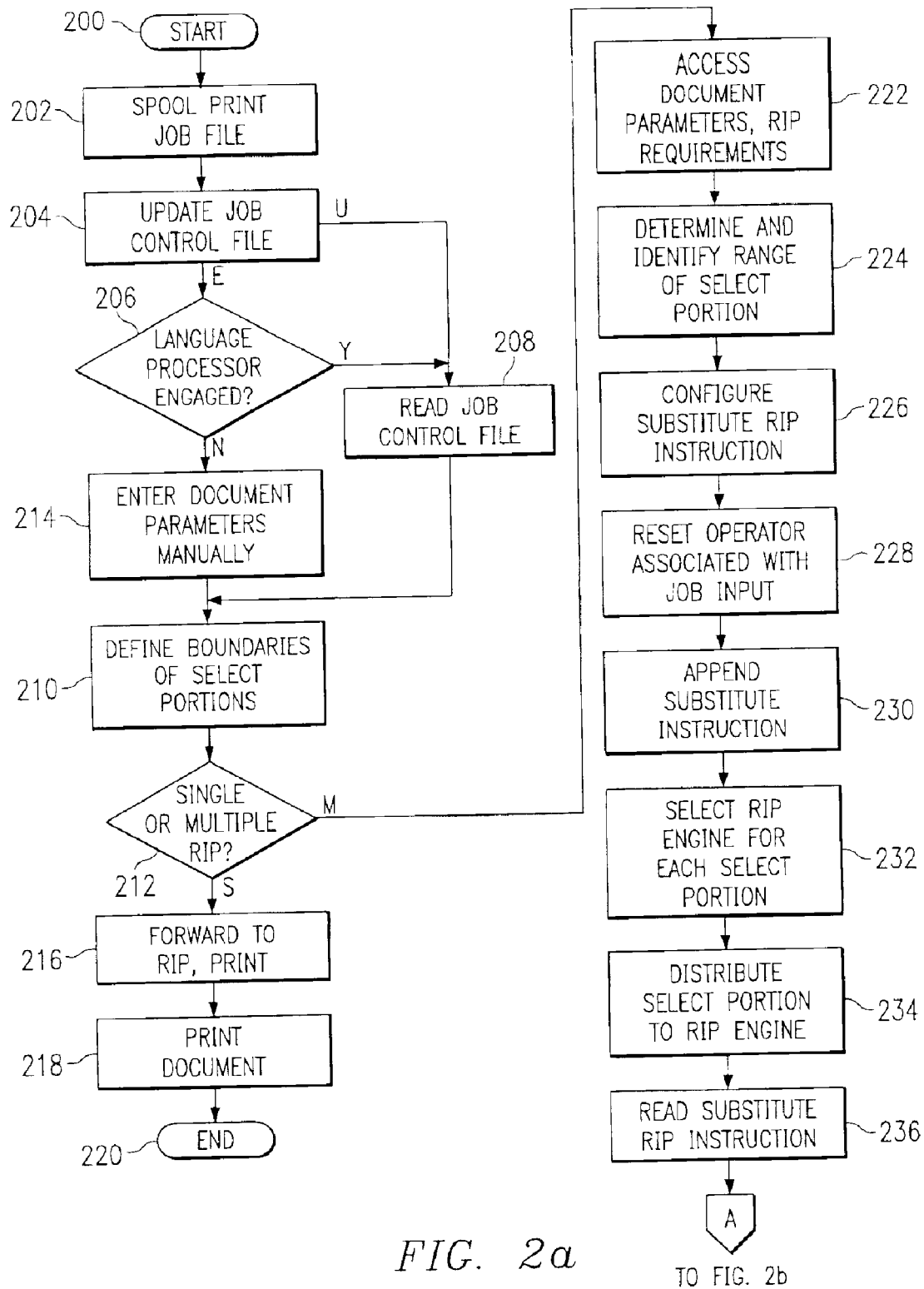
FIGS. 2a and 2b illustrate a flowchart for the operation of the printing system of the present disclosure while performing parallel conversion processing of large print jobs.
Figure 2B:
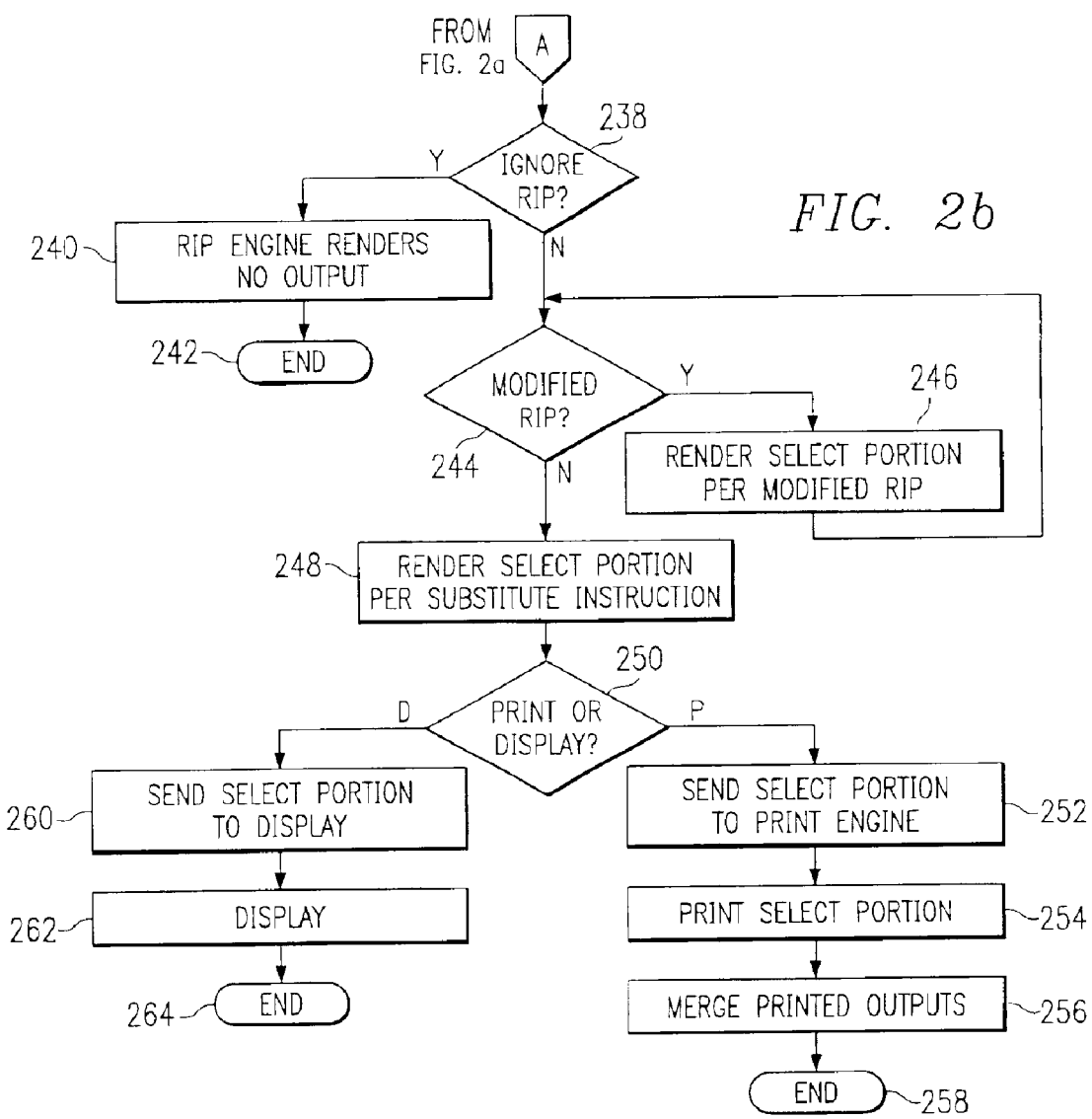

Referring now to FIGS. 2a and 2b there is shown a flowchart for an illustrative system and method for parallel conversion processing of a print job in a print system having a plurality of RIP engines. While the illustrative example describes the operation of a conversion engine that performs raster in each processing (RIP) it will be understood that the process illustrated in FIGS. 2a and 2b applies equally well to the other conversion processes that may be substituted for raster image processing. Beginning from the start block 200, in FIG. 2a, the flow proceeds to a block 202 where the input print job file is spooled into the system. The flow then proceeds to a block 204 to update the job control file 110 which contains operating parameters and program operators for controlling the operation of the processing of the print job file. Block 204 has two outputs, one labeled "E", the other labeled "U." The path labeled "E" proceeds to a decision block 206 where the system determines whether the language processor 120 is engaged. The language processor 120 provides for extracting and utilizing the operating parameter information stored in the job control file 110. If it is found in decision block 206 that the language processor 120 is engaged then the flow proceeds along the path labeled "Y" to function block 208 where the system reads the job control file to obtain the operating parameters needed for the control of processing.

Returning to the function block 204, the second output of the function block 204 labeled with a letter U proceeds to the operation of updating the job control file 110 in function block 208, showing that the job control file will be updated and ready for use when accessed by the language processor 120. Upon reading the job control file 110 in the function block 208, the flow proceeds to a function block 210 wherein the system defines the boundaries of portions of the print job file to be selected for conversion processing in separate, parallel RIP paths. Returning now to decision block 206, if the language processor is determined to be not engaged, then the flow proceeds along the path labeled "N" to function block 214 which provides for entering the document parameters manually for use in function block 210. Block 210 operates to define the boundaries of the select portions of the print job file to be separately RIPed, which is shown by the path from function block 214 to intersect with the path that enters function block 210. The partitioning may be organized so that the page outflow order of the multiple print engines' output is preserved. This requires one-to-one correspondence between print engines and RIP engines. Thus, the outputs may be made collatable to avoid interleaving in a random order out of sequence. The partitioning basis, which is obtained by processing the document parameters, may also be configured to vary with or depend upon the context of the print job in some applications, or even vary with processor speed while dividing the print job file into operable portions.

Continuing now with FIG. 2a, once the boundaries of the select portions of the print job file have been defined in the block 210, the flow proceeds to a decision block 212 to determine whether the print job file will be processed with a single RIP or a multiple RIP. The decision to process with a single RIP or multiple RIP, which may depend on testing for a boundary condition, may typically be based on the total number of pages or other document parameters as previously described and is usually made to facilitate load balancing operations in the parallel RIP of the system and method of the print disclosure. This decision may also be made prior to entering the print job file. In general, large files will be processed using the multiple RIP capability of the print system of the present disclosure. However, if the print job is not large and can efficiently be processed using a single RIP, the system accommodates this by proceeding along the path labeled "S" to a function block 216 to forward the print job file to RIP and print. The flow proceeds to a function block 218 to print the document. Following printing, the flow ends at a block 220.

Returning to decision block 212, if the system determines that the print job file is large and is to be processed in a multiple RIP, then the flow proceeds along the path labeled "M" to a function block 222 where the system accesses the document parameters and the RIP requirements needed for performing the parallel RIP in the print system of the present disclosure. RIP requirements may vary with the application, depending on the particular document parameters. The RIP requirements may also be characterized as standard, full RIP or modified RIP. Modified RIP may further be delineated as accelerated RIP or no RIP. Accelerated RIP may include RIP during fast forward, low resolution or skip modes in order to speed up the RIP of certain portions of a print job file.

Following access of the document parameters and the RIP requirements from the job control file 110, the flow in FIG. 2a proceeds to block 224 where the system determines and identifies the range that the select portion of the print job occupies among the total pages in the entire print job file 104. For example, if a selected portion includes pages 201 to 300 in a print job file having 1000 pages, then pages 201 through 300 define the range of that select portion of the print job file that will be separately RIPed in a parallel RIP part of the process described in the present disclosure. The ability to define a select portion enables RIP of a designated, "less than all" portion of the entire print job as, for example, to insert or revise a chapter of a publication. It was described previously how the boundaries of each select portion are defined using document parameters developed and processed by the language processor 120 in block 206 and subsequent steps. Thus, a page boundary will be associated with each of the pages 201 and 300 to define the boundaries of the select portion. Along with the page boundary information will also be provided the RIP requirements associated with the particular select portion of the print job.

Returning to FIG. 2a, the flow proceeds to a function block 226 where the system configures a substitute RIP instruction to accompany the select portion of the print job file. The substitute RIP instruction is configured and generated according to the RIP requirements and provides the instruction for performing a standard full RIP of the select portion as well as modifying the RIP to be performed on the remainder of the print job file to be processed by the particular processor that will perform the RIP for the select portion. It will appreciated that this flowchart of FIGS. 2a and 2b describes the operations that are performed by the system on a single select portion of the print job file, and that each select portion for which boundaries have been defined will be similarly processed in the order in which the select portion is positioned in the entire print job file. When the configuration of the substitute RIP instruction is completed in block 226 the flow proceeds to a function block 228 where the system resets the operators associated with the print job file as input to the system in block 202. The operators which are reset are those that relate to the RIP that is required for the print job, which operators will be replaced by the substitute RIP instruction described previously. In the next step, represented by a function block 230, the substitute RIP instruction is appended to the select portion of the print job file which will provide the instructions for the RIP by the selected processor or RIP engine.

Continuing with FIG. 2a, there is shown in a function block 232 the step of selecting a RIP engine for each select portion of the print job file to be processed in parallel with all of the other select portions of the entire print job file. The selection is made in the function block 232 according to the RIP instructions which associated a particular designated RIP engine to perform the required RIP of the select portion of the print job file. The flow then proceeds to a function block 234 where the system distributes each of the select portions to an associated RIP engine to perform the conversion processing step. The flow then proceeds to block 236 where the selected RIP engine reads the substitute RIP instruction associated with the select portion that it is about to process and initiates the conversion processing.

Included in the substitute RIP instruction for each select portion is the possibility of performing the RIP in three different ways. It was noted hereinabove that each processor performing conversion processing receives the entire print job along with the designation of a select portion having defined boundaries upon which will be performed a standard, full conversion processing. The remaining portions of the print job file sent to each processor may receive different treatment according to whether the processor is to ignore RIP entirely for part of the remaining portion or is to modify the RIP for some part of the remaining portion of the print job file. Thus, in a decision step 238 in FIG. 2b, flowing thereto from block 236 in FIG. 2a, the determination is made as to whether to ignore the RIP for the particular portion of the print job file that is presented to the processor for conversion processing. If the result of this determination is affirmative, then the flow proceeds along the path labeled "Y" to a function block 240 where the RIP engine renders no output for those particular pages, and the routine ends at a function block 242. If, however, the result of the determination in the decision block 238 is negative, i.e., the RIP is not to be ignored, then the flow proceeds to a decision block 244 wherein the system determines whether the present pages are to receive a modified RIP. If the result of this determination is affirmative then the flow proceeds along the path labeled "Y" to a function block wherein the system 246 will render the select portion according to the modified RIP and return the operation to the decision block 244 to again make the determination on the next page to determine whether a modified RIP will be performed thereon. By way of definition the term "render" refers to the action performed by a RIP engine or a print engine in performing processing on the select portion or a remaining portion.

Returning now to the decision block 244, if the determination is made that a modified RIP is not to be performed, then the flow proceeds along the path labeled "N" to a function block 248 where the RIP engine renders the select portion according to the substitute instruction, that is, the RIP engine proceeds to perform a full standard conversion processing upon the select portion. All RIPed pages, once having been RIPed, may be stored for re-use and/or re-processing. Flow then proceeds from the function block 248 to a decision block 250 where a determination is made as to whether the pages of the select portion subject to the standard, full conversion processing are to be printed or subjected to some other output process displayed. In the case where the RIPed pages are to be displayed, the flow proceeds along the path labeled "D" to function block 260 where the system proceeds to send the select portion of the print job file to a display in the system, and the flow then proceeds to a function block 262 for the actual display of the select portion pages. Following the display the routine ends in a function block 264. Returning to decision block 250, if the result of the determination is to print the select portion of the print job file, then the flow proceeds along the path identified "P" to a function block 252 wherein the system proceeds to send the select portion of the print job file to the print engine that will print the particular select portion. The flow proceeds to a function block 254 where the print engine will be controlled to print the select portion which is followed by the action in a function block 256 where the printed outputs of each of the print engines receiving select portions for printing are merged into the completed document. Following merging of the printed outputs the routine ends at a function block 258.

Returning to decision block 250, if the result of the determination is to select "other" as the output, then the flow proceeds along the path identified "L" to a function block 253 to select a different output, different from a print operation or display operation. This alternate output in block 253 could be an output such as storing the information, sending it as mail, transmitting it over the Internet to another and remote location on the Internet or in general routing it to some other location for some other operation. It should be understood that any type of operation could result at decision block 250. After the operation in function block 253 is complete, the program proceeds to the End block 258.

Figure 3A:
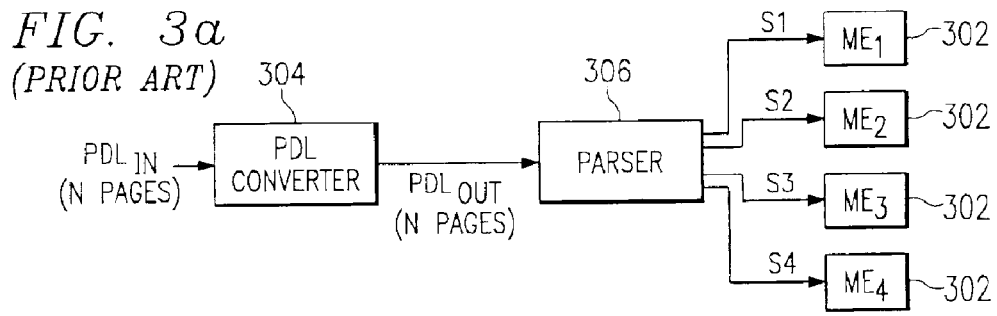
FIG. 3a illustrates a block diagram of a prior art parsing algorithm for a parallel processing system.

Referring now to FIG. 3a, there is illustrated a simplified block diagram illustrating the prior art operation wherein an input PDL job, $PDL_{IN}$ is distributed to parallel marking engines 302 labeled $ME_1$, $ME_2$, $ME_3$ and $ME_4$. The input language is defined as a PDL input, $PDL_{IN}$, this document being a page delineated document such as Post Script®. However, it could be any other type of electronic data file that has contained therein pages of information, which pages of information can be extracted therefrom.

The $PDL_{IN}$ job is processed through a PDL converter 304 which is operable to provide on the output thereof a $PDL_{OUT}$ document. The $PDL_{IN}$ comprises n pages of information, as does the $PDL_{OUT}$ document. Therefore, the PDL converter 304 is operable to convert the entire $PDL_{IN}$ document to the $PDL_{OUT}$ document. In one example, the PDL converter 304 could comprise a PDF Distiller that is operable to receive a PostScript® document and convert it to a PDF document. The advantage of a PDF document is that the PDF document is delineated in pages such that only a desired number of pages can be extracted therefrom, with each page not requiring information regarding another page or information in the file. This is to be compared with a PostScript® language file, wherein the job must be completely processed in a sequential order to the last page at the end of the job, due to the fact that there are instructions embedded throughout the PostScript® file associated with the n pages that may be necessary to process the last page or any page therein. Therefore, conventional processing requires that the entire job be processed.

Once the $PDL_{OUT}$ document is derived from the $PDL_{IN}$ job, this $PDL_{OUT}$ job is then processed through a Parser 306 to derive multiple processing segments, $S_1$, $S_2$, $S_3$, $S_4$, which are all input to respective ones of the marking engines 302. The primary disadvantage to the prior art system is that the PDL converter 304 must process the entire n pages associated with the $PDL_{IN}$ document before the document can be parsed.

Figure 3B:
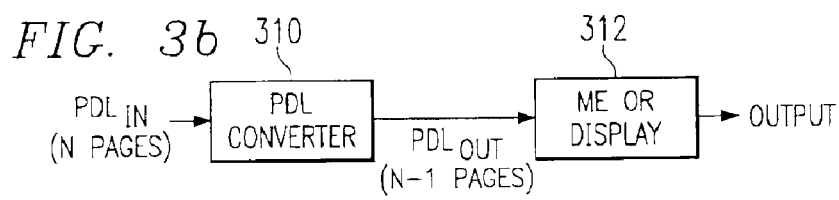
FIG. 3b illustrates the conversion operation of the present disclosure.

Referring now to FIG. 3b, there is illustrated a diagrammatic view for a single engine output in accordance with the present disclosure. The $PDL_{IN}$ document, comprised of n pages, is input to a PDL converter 310, which PDL converter 310 is operable to process the entire $PDL_{IN}$ document, but output less than n pages as the $PDL_{OUT}$ output for a given segment of the job. These segment pages are then processed by a marking engine 312, which also could be a display, it being understood that the marking engine or display 312 is representative of any type of output device. This will then provide an output which could be a viewable display or a paper output.

Referring to the foregoing FIG. 3b, consider that a selected portion or segment S1, S2 . . . Sn of each of the input document files is defined before any subsequent conversion processing. The function that performs the subsequent conversion processing, although it has access to the entire document file in PDL converter 310, only operates on the selected portion or segment of less than n pages of the entire document file. When a document is segmented into several segments or selected portions, the subsequent conversion processing, e.g., in the marking engine 312 (or in a display engine 312 in the alternative) follows the segmentation and distribution of the segment(s) to the subsequent processor. The subsequent processing, then, in a post-distribution processing; here, occurring after distribution of the corresponding multiple of a document file (having an identified select portion of the document file to be subject to the post-distribution processing) to the conversion engine to which the document file was distributed. Typically, the subsequent processing is a conversion of the document file, but instead of converting the entire file, only a segment or select portion of its actually converted—a select portion "less than all" of the n total pages—in each subsequent conversion processor. Thus, parallel processing of multiple document files, and the corresponding select portions thereof. In a plurality of parallel processors, the following distribution has the capability of a substantial reduction in conversion and processing time because (a) the entire "input" conversion 304 is eliminated and (b) the PDL conversion in PDL converter 310 (regardless of the particular type of conversion being performed therein) of each of the individual select portion(s) of the document file $PDL_{IN}$ may be performed in parallel.

Figure 4:
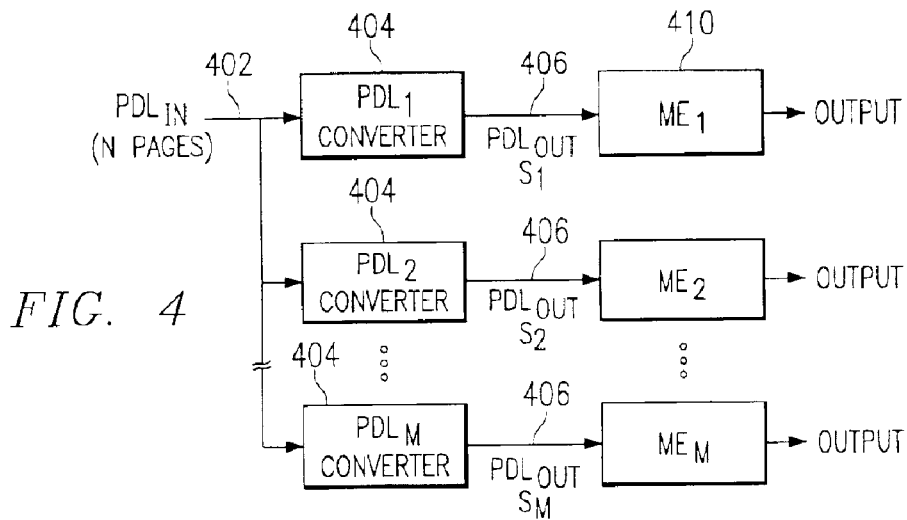
FIG. 4 illustrates a block diagram of the parallel processing operation of the present disclosure utilizing the embodiment of FIG. 3b.

Referring now to FIG. 4, there is illustrated a block diagram of a parallel processing system utilizing the embodiment of FIG. 3b. the $PDL_{IN}$ job, an n-page document, is provided on an input 402. This input in the form of the document is distributed to a plurality of PDL converters 404, there being "M" PDL converters, $PDL_1$, $PDL_2$, . . . , $PDL_M$. Each of these PDL converters 404 is operable to process the entire $PDL_{IN}$ document, but only process the $PDL_{IN}$ document to output a number of pages that is less than the n pages for the associated segment. This provides on an output 406 a PDL output signal for segments $S_1$, $S_2$, . . . $S_M$. Each of these segments is less than n pages, and can be different portions of the file or job, as will be described hereinbelow. Each of the outputs is then processed by an output device in the form of a marking engine, as an example, there being M marking engines 410 labeled $ME_1$, $ME_2$, . . . $M_M$. Each of these marking engines 410 provides an output after processing thereof. As described hereinabove, for a marking engine output, the conversion operation comprises a RIP operation to provide a RIPped document that can then be forwarded to thee marking engine. Therefore, the PDL conversion operation is one of providing a bit mapped RIPped file or output. However, it should be understood that the conversion operation in the PDL converters 404 could convert PostScript® to PDF, PostScript® to html or PostScript® to a display language. Also, any of the languages could be converted to any of the other languages. One aspect of the converters running the conversion processes is that, during the conversion operation, they receive the entire file and convert only the portion thereof necessary to provide on the output thereof a document in another PDL format with a number of pages contained therein that constitute less than the total number of pages to the input job in the input PDL format.

Figure 5A:
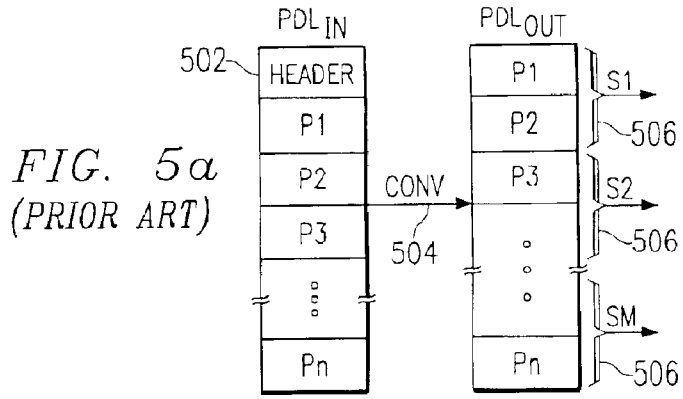
FIG. 5a illustrates a diagrammatic view of a prior art page distribution.

Referring now to FIG. 5a, there is illustrated a diagrammatic view of the conversion operation for the prior art system of FIG. 3a. The $PDL_{IN}$ document is illustrated as having information in the form of a header and a plurality of pages, $P_1$, $P_2$, $P_3$ . . . $P_n$. This constitutes the n pages of the document. The header, represented by a block 502, constitutes the information that is required for processing. In some document files, such as PostScript®, this may require a large number of instructions. Further, although the header 502 is illustrated as being at the beginning of a job, it should be understood that the information in the header could be distributed throughout the job. For example, in PostScript®, there are certain instructions that do not occur until they are necessary. For example, when a color correction is indicated in the middle of the document, certain instructions may occur which are required for later processing. Further, certain instructions in prior pages could be changed at a later portion in the instruction set. Therefore, it is important that all of the instructions be executed during the processing of the job, at least prior to the last page in the segment to be processed.

In the conversion operation, indicated by a line 504, the entire document is processed to the $PDL_{OUT}$ document which is also comprised of $P_1, P_2, P_3, \ldots, P_n$ pages, Each of these pages can then be divided into segments, as indicated by segments 506, $S_1, S_2, S_3, \ldots, S_M$. It is noted that the $PDL_{OUT}$ document is one the facilitates segmentation into separate pages i.e., it is possible to extract the pages therefrom. One example of this is a PDF formatted document. However, the conversion operation 504 requires that the entire $PDL_{IN}$ document be processed and converted into n pages. Therefore, if only the pages associated with segment 506 labeled $S_1$, then a significant amount of processing is required in the conversion operation 504.

Figure 5B:
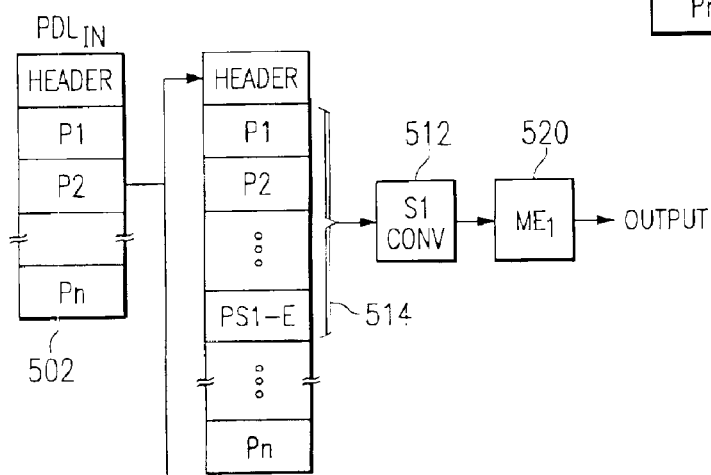
FIG. 5b illustrates a diagrammatic view of the page distribution associated with the embodiment of FIG. 4.
Figure 5B:
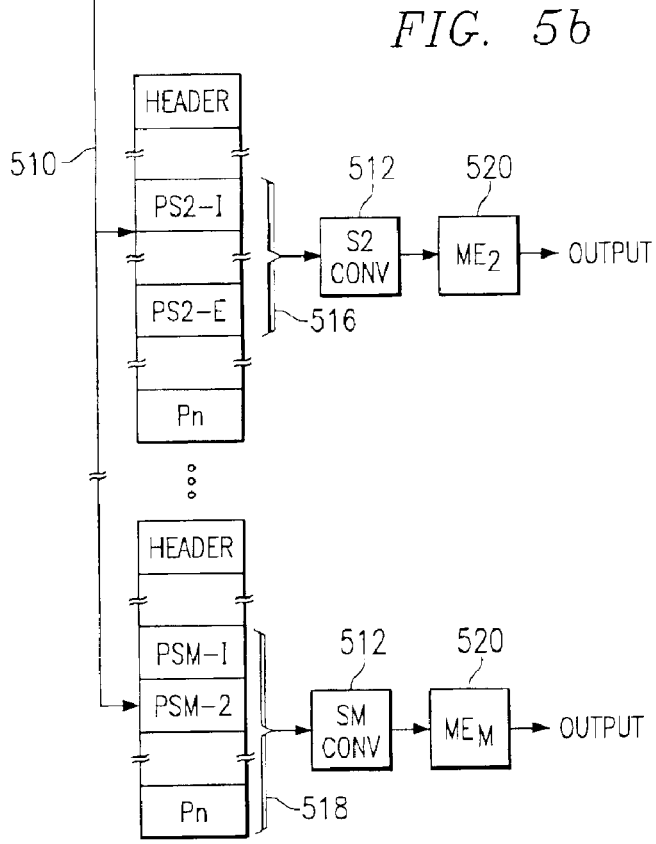

Referring now to FIG. 5b, there is illustrated a diagrammatic view of the embodiment of FIG. 4. The same $PDL_{IN}$ document 502 is provided with the same header 502. This document is distributed to a plurality of conversion operations, this distribution being provided via tree structure 510. This is a virtual distribution, as will be described hereinbelow. There are provided a plurality of separate conversion operations for each segment, an S1 converter 512, an S2 converter 512, ..., an SM converter 512. Each of these converters 512 operates upon the entire $PDL_{IN}$ job. However, it processes only the information necessary to process its particular segment, S1, S2, ..., SM. In the S1 conversion operation, there is illustrated a segment 514 which comprises the pages P1, P2, ..., PS1-E, the page PS1-E, indicating the last page in the document wherein the page P1 is the first page in the segment. It is noted that all pages after PS1-E up to page Pn are not processed. In the S2 conversion operation, there is provided a segment 516 which is comprised of a beginning page PS2-I, the initial page, to PS2-E, the last page in the segment. This segment begins after the first page and prior to the last page Pn. The SM conversion operation is associated with a segment 518, which is initiated at a segment PSM-I which extends through a last page, Pn. Although illustrated as being segmented from an initial section of the document to the last section of the document, these segments could be distributed in any manner.

Each of the conversion operations 512 is operable to provide an output to an output device, in this example, a marking engine 516, there being illustrated M marking engines, $ME_1$, $ME_2$ and $ME_M$. However, as described hereinabove, this output could be to a file, to a display or even to a network.

Figure 6:
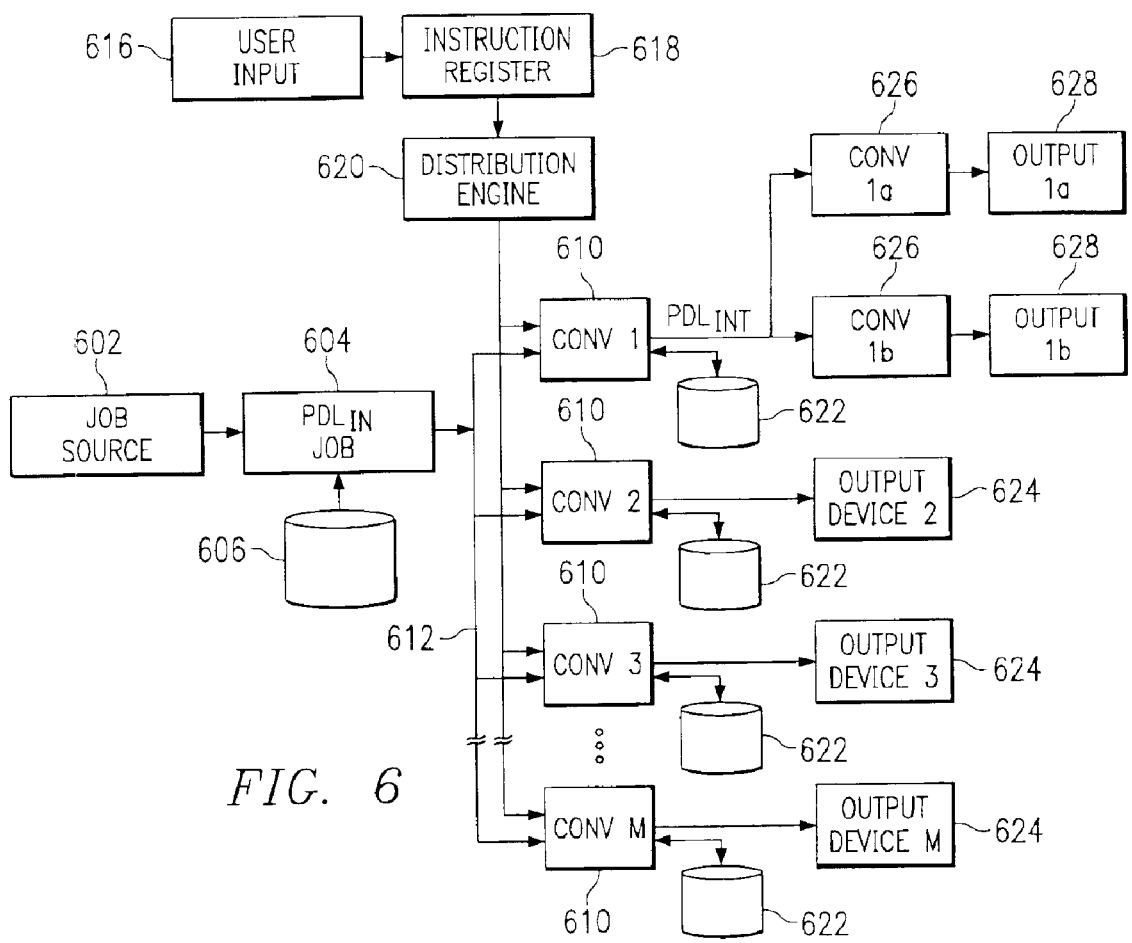
FIG. 6 illustrates an overall block diagram of the parallel processing system of the present disclosure.

Referring now to FIG. 6, there is illustrated an overall block diagram of a distributed processing system. In this device, there is provided a job source 602 for generating the $PDL_{IN}$ job, which is processed through a block 604 and is operable to interface with a storage device 606. For example, the job source 602 could generate the job as a PostScript® file, with the block 604 controlling the storage thereof in the storage device 606. This job could be a very large job. The storage media 606 is interfaced with a plurality of conversion engines 610, labeled CONV 1, CONV 2, CONV 3, ..., CONV M. Each of these conversion engines 610 has access to the storage database 606 through the $PDL_{IN}$ job block 604 through distribution network 612. When the job is initially generated, a user will provide instructions through a user input block 616. The user could provide a priori information as to the number of pages that are to be processed, and how they are to be processed. As described hereinabove, this could be an automatic operation wherein the PostScript® file could be examined prior to processing to determine how it is to be processed. However, this information can be supplied by the user. This information is stored in an instruction register 618. A distribution engine 620 is provided, which distribution engine is operable to parameterize each of the conversion engines 610 to define what segments they are to process. As described hereinabove, each of the conversion engines 610, in order to process its associated segment, will require access to the entire $PDL_{IN}$ job that is being processed.

Each of the conversion engines 610 has associated therewith a database 622 which allows for storage of the converted job, if necessary. Therefore, each of the conversion engines 610 could store the converted output thereof. The conversion engines 610 are labeled CONV 2, CONV 3, ..., CONV M, each having the output thereof provided to an associated output device 624, labeled Output Device 2, Output Device 3, ..., Output Device M, respectively. However, the conversion engine 610 labeled CONV 1 has its output temporarily stored in the database 622 such that the $PDL_{IN}$ job is converted to a $PDL_{INT}$, an intermediate PDL job. This PDL job is then input to second tier conversion engines 626, labeled CONV 1a and CONV 1b. Each of these conversion engines 626 is operable to operate only on a portion of the $PDL_{INT}$ job and provide the output thereof to an output device 628 labeled Output 1a and Output 1b. This tiered operation could be any combination of levels, it being understood that the processing operation in any of the conversion engines 610 or 626 operates on less than all of the n pages associated with a prior conversion engine receiving and operating upon the original $PDL_{IN}$ job. Of course, any other conversion engine could operate on all of the pages, it being understood that at least one of the conversion engines can operate on less than all of the pages to increase the throughput.

Figure 7:
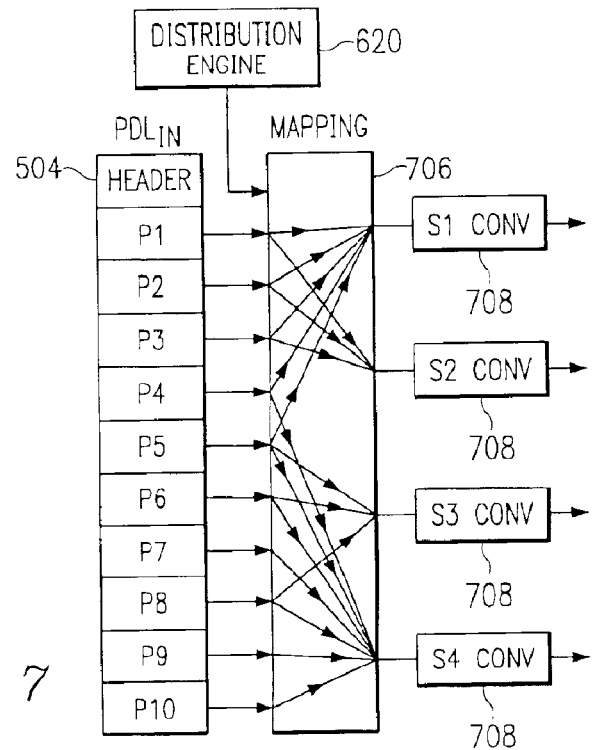
FIG. 7 illustrates a diagrammatic view of the mapping operation from a PDL input job to an output device.

Referring now to FIG. 7, there is illustrated a diagrammatic view of the mapping operation for a single conversion operation. The $PDL_{IN}$ job has associated therewith a plurality of pages, this being a ten page job, having pages P1 through P10. This job has associated therewith a header 704, which header 704 comprises all of the non-graphic information for the pages. It should be understood that some of the overhead required is information such as page start, page end and instructions about a page that really do not constitute the graphics but, rather, constitute instructions to the output device as to how to handle the information during processing thereof and conversion thereof.

In the illustration in FIG. 7, there is provided a mapping block 706 which is operable, under the control of the distribution engine 620, to map the particular pages to the conversion operation, this merely constituting instructions to the conversion engine. There are provided four conversion engines 708 labeled S1 CONV, S2 CONV, S3 CONV and S4 CONV. In the illustration of FIG. 7, the S1 CONV conversion engine 708 has mapped thereto pages P1, P2, P3, P4 and P5. The S2 CONV conversion engine 708 has mapped thereto pages P1, P2 and P3, the S3CONV conversion engine 708 has mapped thereto pages P5, P6 and P8 and the S4 CONV conversion engine 708 has mapped thereto pages P4, P5, P6, P7, P8, P9 and P10. Therefore, it can be seen that the distribution engine 620 can map any number or combination of the pages in the original job to any one of the conversion engines 708. It should also be understood that each of the conversion engines 708 operates independent of the other conversion engines 708 in that it has associated therewith a certain portion of the input job to process and the remaining portion of the job is ignored.

Figure 8:
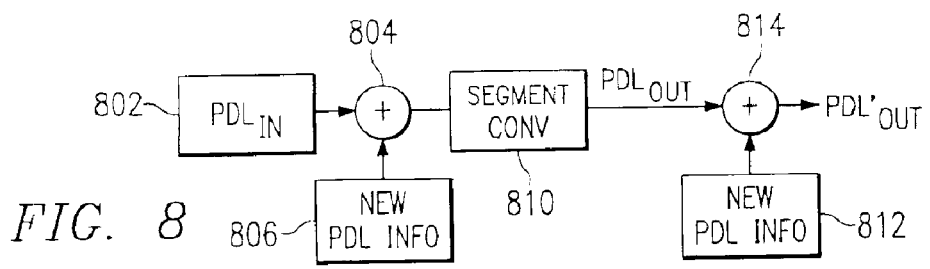
FIG. 8 illustrates a block diagram for an alternate embodiment of the present disclosure wherein information is inserted into the PDL.

Referring now to FIG. 8, there is illustrated a diagrammatic view of an alternate embodiment of the present invention illustrating only a single processing operation. The $PDL_{IN}$ job is provided in a block 802 which is then input to a summing junction 804. The summing junction 804 is operable to sum new PDL information or merge new PDL information from a block 806 with the original PDL input job. Therefore, this effectively converts a job and provides as an output a converted job in the same PDL format. For example, it could be that information in the form of graphics were required to be added to each page in the $PDL_{IN}$ job. It could be that the nature of the PDL job would be changed, for example, from a color job to a black and white job. This summing junction 804 in essence is a conversion operation which requires introduction of instructions or extraction of instructions therefrom. In any even, there is provided on the output of the summing block 804 a converted $PDL_{IN}$ job in the same PDL format. If the job were originally in PostScript®, it would still be in PostScript®, albeit with the new information merged therewith. Further, the output of the summing block 804 comprises all n pages of the document.

The output of the summing block 804 or the output of the $PDL_{IN}$ block 802 without a conversion or merge operation, is then input to a segment conversion block 810 representing the PDL conversion described hereinabove of less than n contained in the original document. This conversion operation can occur in such a manner that new PDL information is merged therewith from a block 812. The block 812 is input to a summing block 814 illustrating the merge operation, and the output of the conversion operation from the segment converter 810 is also input thereto.

Therefore, each of the pages can be processed by the conversion engine 810 to provide a converted PDL output less than n pages with merged information therein. This operation can occur in a first method wherein the conversion operation fully converts the n-1 pages and then the merge operation occurs. However, it could be that the merge operation occurs during the processing such that the conversion operation in the block 810 does not conversion and merging at the same time. This would facilitate faster processing and higher throughput.

Figure 9:
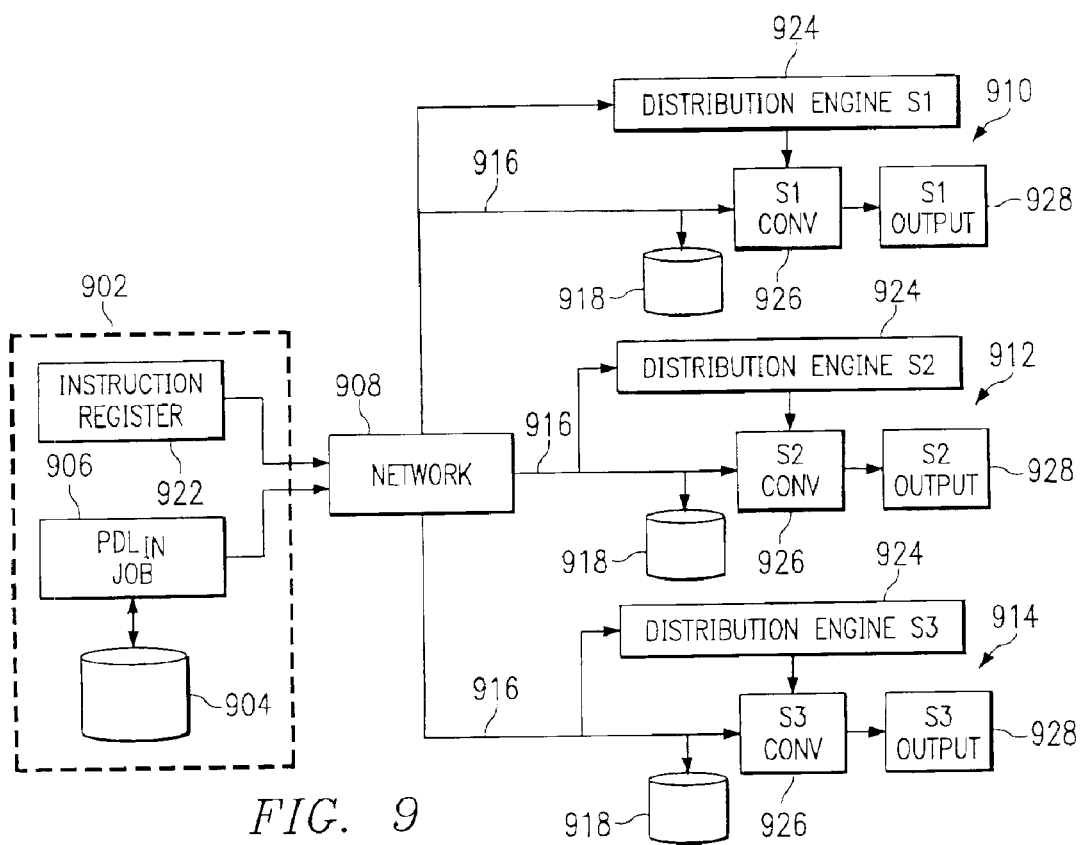
FIG. 9 illustrates a block diagram for a distributed network for providing the parallel processing operation.

Referring now to FIG. 9, there is illustrated a block diagram of an alternate embodiment of parallel processing in accordance with the present disclosure wherein the conversion operation is performed on remote locations on a network. The $PDL_{IN}$ job is disposed at a first node 902 on the network such that the $PDL_{IN}$ job is stored in a database 904 and is accessed therethrough with a job block 906. This job block 906 represents all of the instruction sets, distribution controls, etc. associated with the embodiment of FIG. 6 and with the node 902. The distribution operation is facilitated over a network 908 to a plurality of remote nodes, there being illustrated three nodes 910, 912 and 914. Each of the nodes 910–914 has an interface 916 with the network 908 and a local database 918. The local databases 918 of each of the nodes 910–914 are operable to store the $PDL_{IN}$ job 904. In operation, the entire $PDL_{IN}$ job would be transferred from the database 904 to the local databases 918. In addition, instruction sets defining the instructions that are to be carried out or the segments that are to be processed by each of the nodes 910–914 are transferred from an instruction register 922 at the node 902 to a distribution engine 924 associated with each of the nodes 910–914. The distribution engines 924 are operable to determine how the job is processed at each node. Typically, this will be appended information to the $PDL_{IN}$ job that is transferred thereto, bu tit could be transmitted as a separate operation.

At each of the nodes 910, there is provided a conversion engine 926 that is operable to be controlled by the associated distribution engine 924 to operate on the $PDL_{IN}$ jobs stored in the local database 918 to provide a $PDL_{OUT}$ converted document on the output thereof comprising less than all of the n pages in the original $PDL_{IN}$ job. Each of the nodes 910–914 has associated therewith a separate output device 928 for final processing thereof, this being a marking engine, a storage device or a display.

As can be seen in the operation of the embodiment of FIG. 9, each of the processing engines 926 requires the entire $PDL_{IN}$ job to be transferred thereto and stored in order to process the particular segments associated therewith. If the prior art system were utilized, then the $PDL_{IN}$ job would first require conversion to a format that would allow only the pages that are being processed at the node to be transferred thereto over the network 908. Utilizing the system of the present disclosure illustrated in FIG. 9, the step of processing the entire $PDL_{IN}$ to the intermediate format is eliminated.

Figure 10:
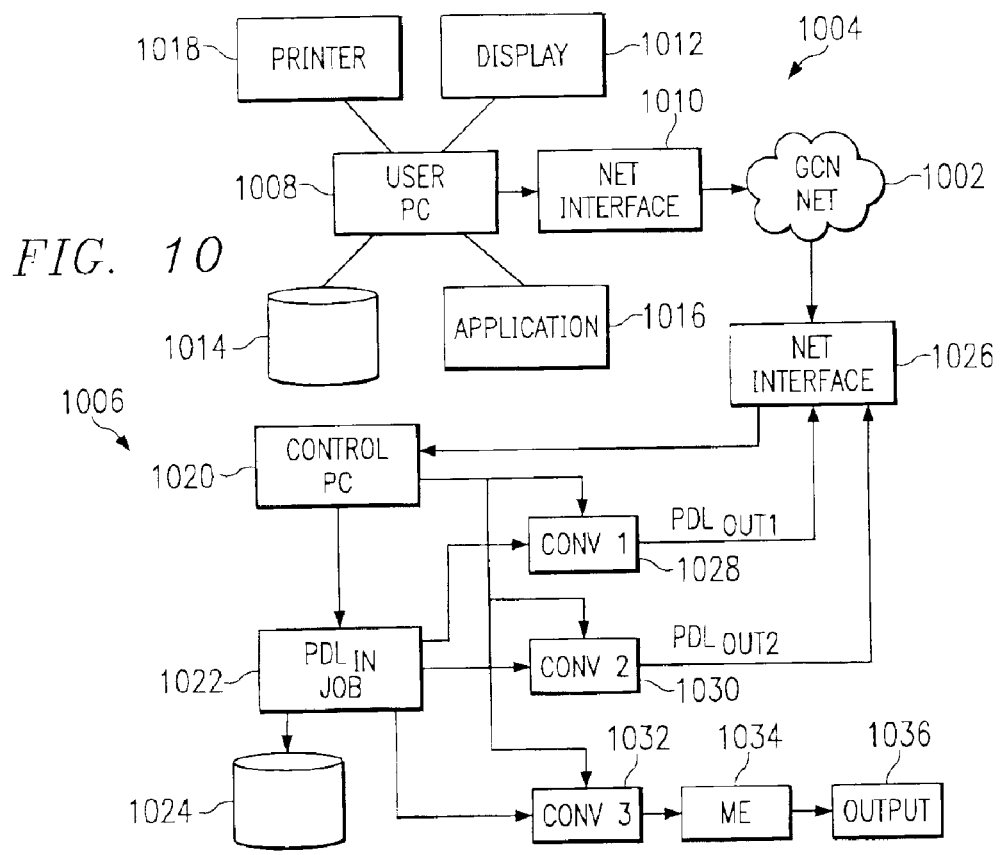
FIG. 10 illustrates a diagrammatic view of one application of the system operating over a global communications network.

Referring now to FIG. 10, there is illustrated one application of the parallel processing system of the present invention. There is provide a global communication network 1002 which is a network of a plurality of computers, routers and various links that allow information to be independently transferred between locations on the network. This typically requires a computer at one location to send a TCP/IP packet of information to the network that is routed to another location which then handles this packet and forwards information back to the originating computer in return. It is the transfer of these packets that constitutes the communication link. Although this is virtually real time, there is no actual direct connection, but merely a relaying of packets over a particular route that is defined on the network. The global communication network (GCN) 1002 is typically referred to as the "Internet."

There is provided a user node 1004 and a vendor node 1006 on the network. At the user node 1004, there is provided a user PC 1008 having a network interface 1010 to a facilitate interface with the network 1002. The user PC 1008 has associated therewith a display 1012 and a database 1014. In addition, the user has an application 1016 associated therewith, which application is typically a browser software application. This browser application allows the user to send instructions to another node on the network, to receive information and to in general interact with the network and remote nodes thereon.

At the vendor node 1006, there is provided a control PC 1020 which is operable to interface with a PDL job block 1022. The PDL job block 1022 can be controlled to access a select one or select ones of a plurality of PDL jobs stored in a database 1024. These typically are stored in one particular format, the $PDL_{IN}$ format. The control PC 1020 interfaces with the network 1002 through a network interface 1026. This control PC 1020 is operable to receive requests from the user PC 1008 for information and effect a communication therewith through a TCP/IP interconnection. Once the interconnection is facilitated, the user at the user location 1004 can then request information in the form of all or a portion of certain jobs for output on the display 1012 at the user's location or even on a printer 1026.

In the embodiment of FIG. 10, the vendor at the vendor location 1006 provides two conversion operations, the first conversion operation in a conversion engine 1028 and a second conversion operation in a second conversion engine 1030 for interface with the network through the network interface 1026. There is also provided a third conversion operation in a conversion operation 1032 that is a local conversion operation. This conversion engine 1032 is operable to provide the above disclosed conversion for output to a marking engine 1034 to provide an output 1036. All of the conversion engines 1028, 1030 and 1032 are interfaced with the control PC 1020.

The conversion engine 1028 and the conversion engine 1030 are operable to operate on different portions of the job that is processed and retrieved from the database 1024 by the PDL job bock 1022. In this embodiment, the user can request a certain segment of information which can be provided thereto by the conversion engine 1028 in a first PDL format $PDL_{OUT1}$, whereas the conversion engine 1030 can provide the output in a PAL format $PDL_{OUT2}$. In one example, a user may request information regarding a document such as a book. This book is delivered in two ways. In the first way, the book is downloaded over the network 1002 in either an HTML output for storage and reading thereof, or in a printed output. The second mode is to have it delivered to the purchaser via a land based mail carrier, wherein the conversion engine 1032 will provide the printing operation through the marking engine 1034. However, the user may wish to preview a sample of this document. In this operation, the vendor 1006 does not wish to process the entire job merely to allow the user to sample a few pages out of a very large document. If the book were 1000 pages in length and the vendor merely wanted to allow the user to review the first ten pages of the book, the table of contents or even the first page of a given chapter, this could be facilitated with the conversion engine 1028. This would allow the vendor 1006 to provide to the user a document (in the form of an HTML file) that is less than all pages in the main $PDL_{IN}$ document by converting the document in accordance with the present disclosure. For example, the introductory page, table of contents and the first one or two pages of each chapter could be converted into a single HTML document and forwarded to the user PC 1002 for output on the display 1012, i.e., which is facilitated with the use of a browser application over the GCN 1002. Thereafter, the user could request downloading of the entire document, which could be facilitated with the conversion engine 1030. This could be provided in an HTML format or it could be provided in a printer language. If the user had utilized one printer language known at PCL5, a language associated with Hewlett Packard® printers, this document could be provided in that particular printer format for direct output on the printer 1026, or any other format that facilitates output on the printer 1026. It is noted that a RIP output probably would not be acceptable for transferring to a user's PC for transfer to a marking engine, as few consumers posses that capability.

By utilizing the conversion engine 1028 of the above disclosed conversion operation wherein the entire input PDL job is converted to a particular page delineated format for an output document of only select pages of the n pages of the original document, throughput can be increased. This could be compared to a situation wherein the vendor would be required to convert all of his jobs initially into a format such as PDF for storage thereof and later retrieve only a segment, convert the entire job to PDF when requested and only output a certain number of pages, or utilize the above described disclosure for converting only a portion thereof on the fly. It would be undesirable for a publisher with a large number of documents to have all of these documents converted to a PDF format for access by a user. The reason for this is that some of these documents may be accessed very rarely. One advantage of electronic storage is that the inventory is substantially zero and the primary cost is throughput.

In the above disclosure utilized for parallel processing to provide segmented operation wherein segmented operation is associated with an output RIP, the present disclosed embodiment is compared to the prior art wherein there was a distilling operation or a parsing operation. In the present disclosure, the entire job is processed wherein only certain portions of the job are output such that the portions that are not output have the effect of increasing the processing speed for the particular segment. The performance of the two approaches will be compared, the first being the preparing or prior art system and the second being the segmented RIPs, wherein the RIP is the output PDL language, it being understood that other PDL languages can be provided as the output language. In the pre-parsing language such as converting the entire job or document from Postscript® to PDF and then RIPPING the job, a job is processed consisting of n pages with the total time, T, to parse from Postscript® to PDF, RIP the job and then merge the separately RIPped pages together is defined by the following relationship:

$$T=Mn+nP+(n/N)S$$

wherein:
M is the rate at which pages are merged after RIPping in sec/page;
P is the speed with which pages are distilled or parsed in sec/page;
N is the number of conversion engines; and
S is the rate at which the RIP can rasterize the pages in sec/page.

Figure 11:
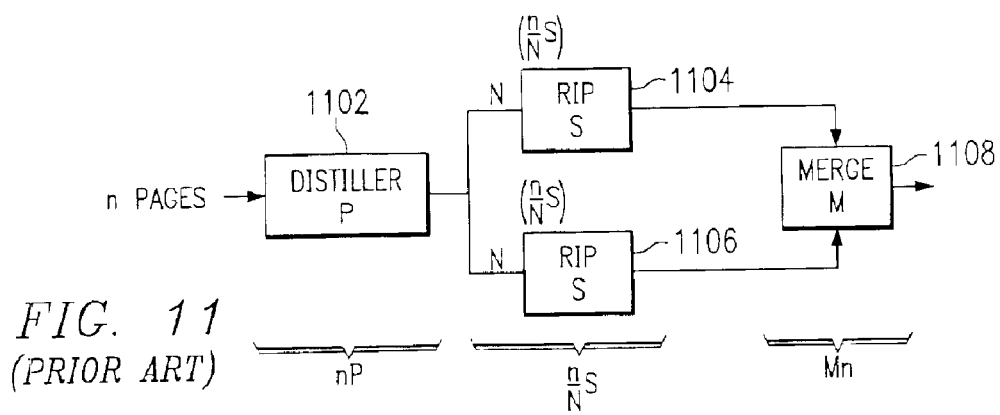
FIG. 11 illustrates a block diagram for the example for a prior art parsing system.

Referring now to FIG. 11, there is illustrated a diagrammatic view of this equation for pre-parsing. It can be seen that the n pages are input to a distiller 1102 which is operable to distill at a rate of P sec/pages. For n pages, this will require a time of nP. This will provide on the output thereof segments to two RIP engines, in this example, a RIP engine 1104 and a RIP engine 1106, each of which is operable to RIP at a rate of N sec/page. There are provided N pages to each RIP engine 1104 and 1106, it being understood this can be segmented in a number of different ways. Each RIP engine 1104 and 1106 will take (n/N)s seconds to RIP the pages associated therewith. These will then be output to a merge block 1108 which will merge at a rate of M sec/age for a total merge time of Mn. This will provide the total time.

The For the segmented RIPping, the following relationship will exist:

$$T=Mn+(n/N)S+(n-n/N)L$$

wherein:
L is the rate at which the RIP can rasterize and not output a low resolution, non-rendered, quick version of the page n Sec/page.
It can be seen that when, $$(n-n/N)L=nP$$

the performances is equal for the two approaches. This assumes that n>>N and the number of pages is known (approximately) prior to RIPping such that the RIP page setup switch time can be ignored. From this relationship, it can be seen that "quick RIPping" or advantages derived from not processing the graphic portions of certain non-selected pages during processing of the entire PostScript® file will result in a savings of time at each RIP engine. This is due to the fact that the parsing operation to derive the page has been deleted.

Referring now to FIG. 12, there is illustrated a block diagram of the operation for segmented RIPping. The n pages are forwarded to two conversion engines 1202 and 1204 which are operable to convert less than all of the n pages, that being the N pages, this being equal for the two conversion engines for this example. This will then be input to RIP engines 1206 and 1208, respectively for the output of the two conversion engines 1202 and 1204. Each of these RIP engines will operate similarly to RIP engines 1104 and 1106, in that they will RIP at a rate of S sec/page. The output will then be input to a merge block 1210 similar to merge block 1108 for merging thereof.

If the operation of the two procedures, the pre-parsing and the segmenting RIP, are compared with two or four RIPs, it can be seen that for two RIPs the parsing speed to the distiller must be twice as fast as the high speed RIP mode to the segmented approach to equal the latter in overall performance. If there are four RIPs, then the parsing operation must be 30% faster than the high speed RIP mode to offer an overall performance benefit. As N becomes very large (many RIPs), the faster method is determined solely by a comparison of the speed of the "high speed RIP mode" compared to the distiller speed.

Referring now to FIG. 13, there is illustrated a diagrammatic view of the $PDL_{IN}$ job, in the PostScript® file format. In PostScript® format, there is provided a file that is basically a sequence of instructions. In order to operate on a page basis, the system must be able to discriminate pages. However, in PostScript®, for example, if one were to define where the page began and only process the information associated with an instruction at the page beginning to an instruction at the page end, it might be that certain instructions that preceded that page were necessary for the overall processing operation. This is the specific case with respect to PostScript®. This is why instructions for the entire document must be executed such that n pages at the input will result in n pages at the output of any conversion operation between two PDL languages in the prior art.

With further reference to FIG. 13, it can be seen that there is provided some header information 1302 which is basically a sequence of instructions. Following the instructions would be page information. There are illustrated two pages, a first page 1304, and a second page 1306 embedded within the document. Each page has associated therewith operators that define the page start instruction or operator, some page instructions or operators associated with the content of a page as to how it is to be rendered, page graphics and a page end instruction or operator. When the conversion engine is processing through the file, it will sequentially execute the instructions from the beginning until it reaches a page start instruction or operator. At this page start instruction or operator, the next instruction or operator will provide information as to what page number it is and various instructions associated therewith. This can be examined to determine if the page is within the range of operation, i.e., if the page is within the defined segment. If not, then the system can skip all the way to the page end instruction, thus skipping the page graphics. This is where the time saving exists, this referred to as the "quick RIPping" operation. This operation allows the conversion operation to skip the time required to convert this portion of the document into an output PDL format. This skipping can continue until a page start operation is encountered that is within the range of operation. At the end of the range, it will continue to skip pages. However, it is noted that the entire document will be processed in order to ensure that all instructions associated with rendering the page are extracted from the file. Once the last page in the range has been received, then the operation can skip to the end of the document without actually going through the remaining portion thereof.

Referring now to FIG. 14, there is illustrated a flowchart depicting the operation of processing through a PostScript® file. This is initiated at a block 1400 and then proceeds to a block 1402 to process the collateral instructions. These collateral instructions constitute the header information that is not associated with the actual graphics of the page. The program will then flow to a decision block 1404 to determine if the current page is in the range, this occurring when the page start operator is encountered. If so, the program will flow along a "Y" path to a function block 1406 to process the operators for the page, i.e., render all of the graphics. The program continues to process the operators until the end of page command where the associated instruction operator indicating the end of the particular page is encountered at a decision block 1408, and then the program proceeds to a function block 1410 to render the page. The program then proceeds to a decision block 1412 to determine if this is the last page in the range of the particular segment being processed. If not, the program will continue back to the input of function block 1402 to again process any collateral instruction that may be interspersed between pages and then to the next page to determine if it is still in the range. When all of the pages in the range have been processed, the program will flow to an EXIT block 1414. This constitutes the decision that the segment is complete, whereas the decision block 1404 determines whether a particular page is within the range, i.e., whether it is part of the segment. For example, it may be that page 4, page 5 and page 7 are processed in a segment such that it is important to skip pages 5 and 6. When this occurs, the program will flow from decision block 1404 along a "N" path to a function block 1416 to skip the graphics operators for those pages, i.e., this providing the savings in processing time. The program will then flow to a function block 1418 to determine if this is the end of the page, i.e., whether all graphics operators have been skipped. Once this is achieved, the program will flow to the input of decision block 1412 and continue processing.

Figure 15:
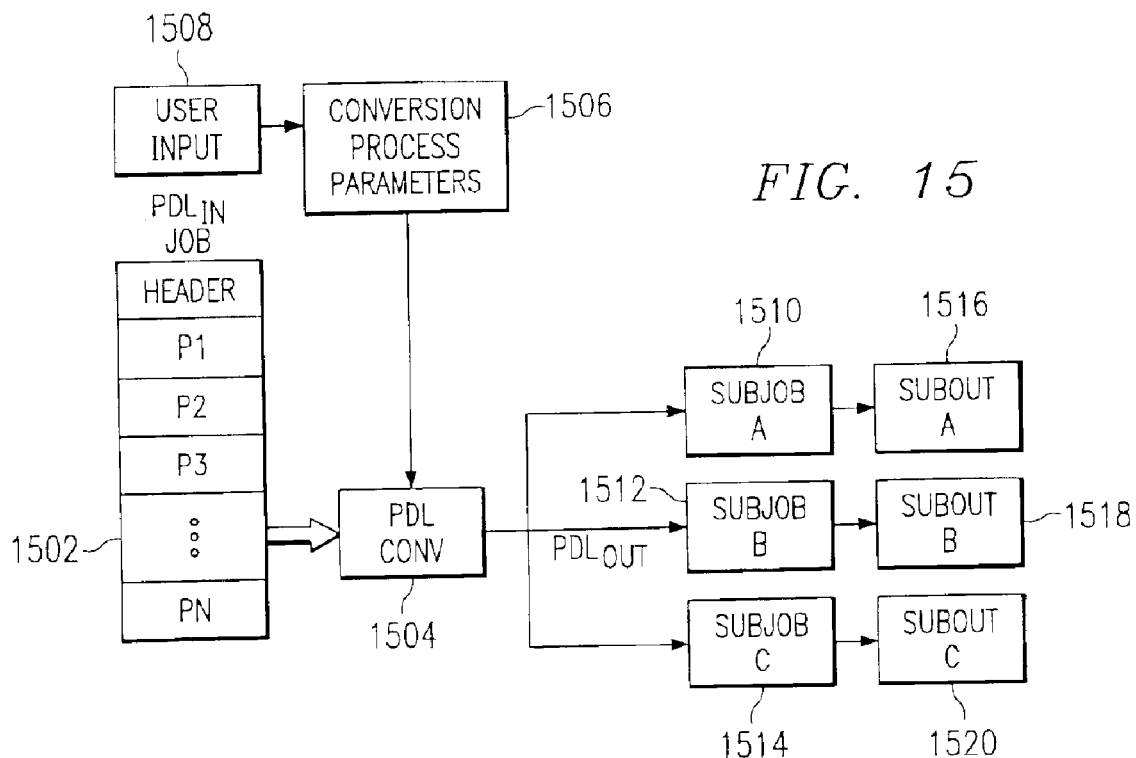
FIG. 15 illustrates a block diagram of an alternate embodiment.

Referring now to FIG. 15, there is illustrated a diagrammatic operation of an alternate embodiment of a process for converting one PDL language into another PDL language. The $PDL_{IN}$ job is illustrated as having a header and N pages, as described hereinabove. This is indicated by a reference numeral 1502. The $PDL_{IN}$ job 1502 is in a first PDL language, this being the input PDL language. This is to be converted to an output PDL language by a PDL conversion block 1504, as was described hereinabove. In this example of FIG. 15, only a single PDL conversion is performed. Also as described hereinabove, the PDL conversion 1504 operates in conjunction with various process conversion parameters 1506 which are input by the user. These are basically the instructions that were described hereinabove with respect to FIG. 6 as stored in the instruction register 618. This is provided by user input 1508. In general, whenever a user applies an input, this input defines, first, the segments that are to be distributed to different conversion processors or engines and, second, how that conversion process is to operate on the whole job to extract the particular pages or information therefrom, in accordance with the stored parameters or instructions.

Figure 16:
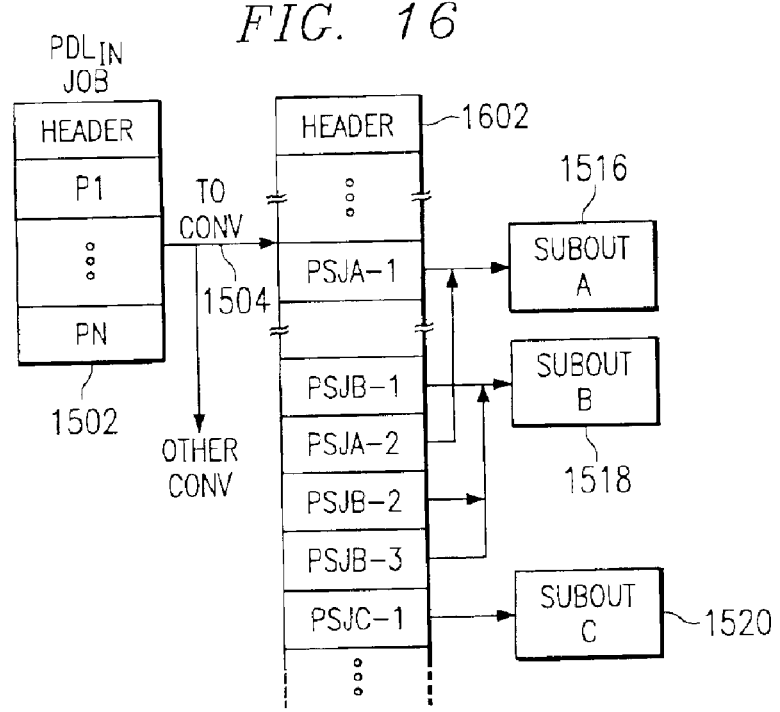
FIG. 16 illustrates a diagrammatic view of the embodiment of FIG. 15.

In embodiment illustrated in FIG. 16, the conversion process parameters 1506 define various "subjobs" associated with the particular segment that is to be converted by the conversion process 1504. It may be that all the pages are to be converted by this conversion process. However, in this embodiment, the parameters define which page is associated with which subjob for output. As an example, the $PDL_{IN}$ document could be a postscript job and the $PDL_{OUT}$ document could be a PDF document. However, when performing the conversion, the PDL conversion block 1504 has the ability to examine each page and the operator associated therewith to determine how to operate on that page and essentially "render" the output. During this examination process, the operators that are stored within and integral with the $PDL_{IN}$ job can be reviewed to determine certain aspects of the page. As an example, if a $PDL_{IN}$ document had associated therewith various color pages, various black and white pages and pages of different resolutions, it may be desirable to output them to separate marking engines or to separate displays. In the marking engine example, wherein the $PDL_{OUT}$ document is a rasterized image, all color pages would be output to a color marking engine, all black and white pages would be output to a black and white marking engine and possibly pages having contone images could be output to a third marking engine. This is illustrated in FIG. 15 wherein there are provided three subjob blocks 1510, labeled "Subjob A," a subjob block 1512 labeled "Subjob B" and a subjob block 1514, labeled "Subjob C." Each of these subjobs 1510–1514 are output to an associated subjob output blocks 1516, 1518 and 1520, respectively, labeled "Subout A," "Subout B," and "Subout C." Further, these outputs could be memory for storage and later retrieval therefrom. It is only noted that the conversion operation performed by the conversion block 1504 provides a conversion from one PDL format to another PDL format with the distribution performed at the output thereof based upon aspects of the job during the conversion process. During the conversion process, provided by the PDL conversion blocks 1504, it should be understood that it may be parameters associated with the input PDL document, $PDL_{IN}$ or the output PDL document, $PDL_{OUT}$, that allows discrimination to be achieved. It may be that operators in the Postscript® job more easily facilitate a determination as to whether a job is a color job or a black and white job, or it may be the output PDL language that facilitates this determination. In any event, once the conversion process parameters are provided by the user in the conversion process parameter block 1506, the PDL conversion block 1504 can make this discrimination based upon a page-by-page basis during the conversion process on the portion of the entire job that is being handled by the PDL conversion block 1504.

Referring now to FIG. 16, there is illustrated a diagrammatic representation of the embodiment of FIG. 15. In this illustration, the entire job is output to the PDL conversion block 1504 and to other conversion blocks as well. The conversion block 1504 operates on the number of pages that are defined by the conversion process parameters 1506 associated with that PDL conversion block 1504. This, as described hereinabove, can be any combination of parameters. It could be that all color pages in a certain range go to one subjob, all black and white pages within the same range go to another subjob, or the subjobs could even have different ranges within the segment. It should be understood that the PDL conversion block 1504 must operate on substantially all instructions from the initial portion of the job to each successive page, the speed benefit being realized through skipping graphic operators in pages that are not associated therewith, as described hereinabove.

The PDL document 1502 is forwarded to the conversion process and then operated on to provide the various outputs. As illustrated in FIG. 16, the file is associated with the document is processed in accordance with the embodiment described hereinabove from a header 1602 through to a first page associated with the Subjob A block 1510, PSJA-1. This is processed as described hereinabove, such that all graphics operators are processed and then the page allowed to be rendered by outputting it to the Subout A block 1516. The system will proceed to the next page that is in the document, this being PSJB-1 in the present illustration, the first page in the Subjob B block 1512. This is processed and rendered for output to the Subjob B block 1518. The next page in the document to be encountered is associated with the Subjob A block 1510, page PSJA-2, which is also forwarded to the Subjob out A block 1516 and then processing proceeds to page PSJB-2, PSJB-3, pages 2 and 3 for the Subjob B block 1512, and then to the first page in the Subjob C block 1514, a page PSJC-1. This is output to the Subjob C block 1520.

During processing, the PDL conversion block 1504 will process all operators associated with the operation of rendering the page. However, it could be that a second tier of parallel processing were provided wherein, once the page information were determined to be desirable, this page information, i.e., the graphics operators, could be output to a separate processor, which processor would be associated with the subjobs blocks 1510–1514, one processor for each of the Subjob blocks 1510–1514. Therefore, the PDL conversion block 1504 would merely process through the pages to determine which pages are to be operated on and the graphics operation associated therewith delegated out to the Subjob blocks 1510–1514.

Figure 17:
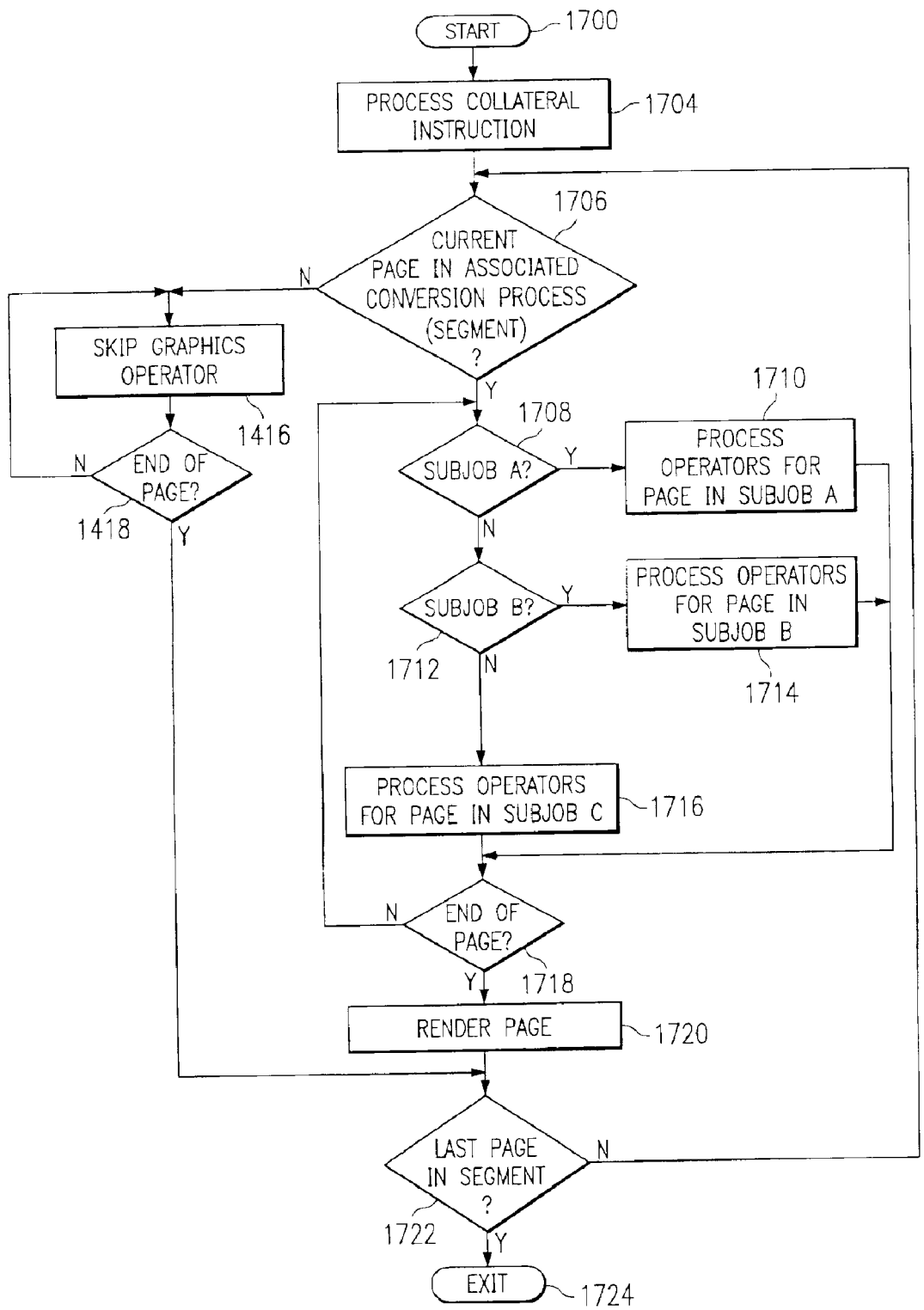
FIG. 17 illustrates a flowchart depicting the operation of the embodiments of FIGS. 15 and 16.

Referring now to FIG. 17, there is illustrated a flowchart depicting the operation of the embodiments in FIGS. 15 and 16, this being substantially similar to the flowchart of FIG. 14 described hereinabove. The flowchart is initiated at a start block 1702 and then proceeds to a function block 1704, similar to function block 1402 to process collateral instructions. The program then proceeds to a decision block 1706, similar to decision block 1404, to determine if the current page is associated with the conversion process being performed, i.e., whether it is associated with the segment. If it were merely a range of pages, this would only require determining if the current page was in the range. However, other parameters can be utilized to determine whether this page is associated with the conversion process. For example, it could be that a conversion process requires all pages that had color information contained therein be output to a display, or base the selection upon the actual content in the page, i.e., examine the contents of the page in the input PDL format and only render the page if the content thereof was associated with the selection criteria. If it is determined that the current page is associated with the particular segment for a conversion process that is being operated, the program will flow on a "Y" path to a first subjob decision block 1708 that determines if the page is associated with the first subjob. If so, the program flows along a "Y" path to a function block 1710 to process the operators, similar to block 1406 in FIG. 14. If it is not Subjob A, the program flows to a decision block 1712 to determine if the page is associated with Subjob B. If so, the program will flow to a function block

1714 to process the operators therein. If it is determined not to be Subjob A and not Subjob B, then it must be Subjob C and the program then flows to a function block 1716 to process the operators therein. The program will flow to a decision block 1718 to determine if all operators in a particular page have been processed. Until they have been processed, the program will loop back around to the input of decision block 1708. Once processed, the program will flow to a function block 1720 to render the page and then to a decision block 1722 to determine if it is the last page in the segment. If not, the program will loop back to the input of function block 1706. At the end of the last page in the segment, the program will flow to a block 1724 to exit the program.

At the decision block 1706, when it is determined that the pages are not within the segment, the program will proceed as described hereinabove with respect to FIG. 14, i.e., it will skip the graphics operators and flow directly to the input of decision block 1722.

Figure 18:
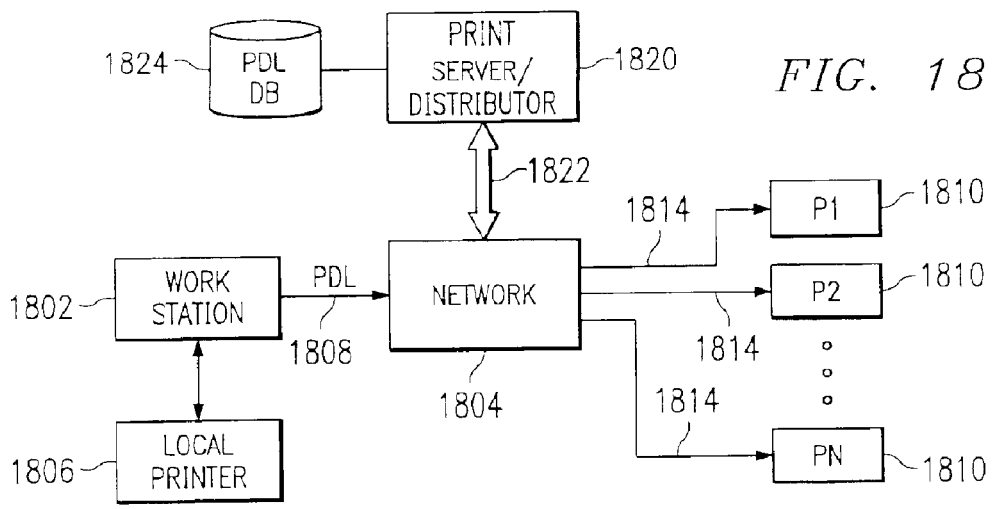
FIG. 18 illustrates a block diagram of a print distribution embodiment.

Referring now to FIG. 18, there illustrated a diagrammatic view of a job distribution printing system. In the system of FIG. 18, there are provided a plurality of work stations 1802, of which only one is illustrated, disposed about a network 1804. Each of the work stations 1802 is operable to generate print operations wherein a print job is created by a particular application and passed onto the operating system of the work station 1802 to be processed by the associated print manager therein. A typical operating system having such a print manager is the Windows® NT system, a very conventional and well known system. However, other operating systems can be facilitated at the work station 1802. The work station 1802 is illustrated as having a local printer 1806 associated therewith and connected to the network 1804 with a network cable 1808, which allows the work station 1802 to interface with the network 1804. This network interface cable 1808 facilitates an interface with the use of various network interface cards (NIC) at the work station 1802 and similar cards at the network 1804. The network 1804 interfaces with various print devices 1810 which are labeled P1, P2, . . . , PN. Each of these printers is interfaced to network 1804 with the network interfaces 1814. The printer devices 1810 can be network printers that are directly connected to the network, or they can be printers that are connected to the network through a print server device such as a computer. For example, the local printer 1806 could be made a network printer and be part of the printer group 1810. However, for the purpose of description, printers in the group 1810 are considered to be available network printers for routing of information thereto, as will be described hereinbelow. The distribution operation of print jobs that are directed to the network by the work station 1802 are handled by a print server/distributor node 1820 disposed on the network and interfaced thereto with a network interface connection 1822 which could be a wired connection or a wireless connection. The print server/distributor node 1820 is operable to receive PDL print jobs from the work station 1802 for processing thereof. The manner by which these PDL jobs are transmitted to the print server/distributor node 1820 is facilitated by providing at the work station print manager a printer definition that is defined as a "Destination Queue," which will be described hereinbelow. The printer server/distributor node 1820 is operable to receive the PDL, process the PDL for distribution purposes and modify the manner by which this PDL job is printed. The PDL job is first converted to a format compatible with the operation of the printer server/distributor node 1820 prior to distribution to the appropriate print devices. Further this can then be stored in a job database 1824. After processing of the PDL job, the PDL job, in its modified form, is then routed to one or more of the printers and/or output targets 1810, i.e., distinction devices, in the available group. The printer server/distributor node 1820 has available to it a plurality of printer definitions which are defined as Destination Queues. These Destination Queues are a process that is "scripted" to define the manner in which the PDL print job is routed to the printers and handled by the printers. For example, if ten pages out of 100 in a particular PDL job were color pages, these pages could be routed to a color printer and the remaining pages, being those being black and white pages, could be routed to a black and white printer. Further, each of the printers provides status information as to its availability, its toner levels, etc., these all utilized to determine the manner by which the print job will be handled. It is noted that all pages will be sent to the printer, even though only select ones are printed.

Figure 19:
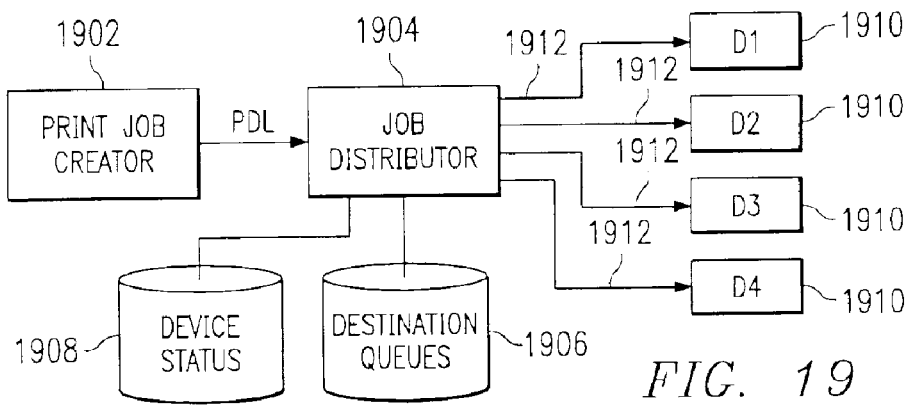
FIG. 19 illustrates a block diagram of the operation of the job distributor.

Referring now to FIG. 19, there is illustrated a more detailed diagrammatic view of the job distribution operation. There is provided a print job creator 1902 which is operated to generate the PDL. This can be a work station having a print manager associated therewith or it could be a separate application. The PDL is transferred to the job distributor 1904 which interfaces with a database 1906 of Destination Queues, these queues providing the script that defines where the PDL will be routed. Each of the PDLs, when routed to the job distributor 1904, are routed to a specific Destination Queue. The job distributor 1904 also has access to a device status database 1908 that defines the status of the various output devices 1910, of which four are illustrated. It should be understood, however, that any number of destination devices could be accommodated by the job distributor 1904.

Each of the devices 1910 has an address on the network which allows access thereto by the job distributor 1904. The job distributor provides the PDL jobs to the destination devices 1910 via input lines 1912. Although not illustrated, there are also provided return paths from the destination devices 1910 back to the job distributor 1904. These are for the purpose of apprising the job distributor 1904 of the status information thereof.

In operation, the PDL is transferred to the particular Destination Queue 1906 associated with the job distributor 1904 and, with use of the script in this Destination Queue, the job distributor then processes the PDL and then routes it to the destination device 1910. When routed, as will be described hereinbelow, the PDL job has associated therewith various printer control commands that define how the printer or the device 1910 is to handle the information. This is very similar to a conventional system wherein a PDL is created and transferred to a printer. As part of defining the print job in a particular PDL, such as "Postscript," a series of commands associated therewith which are sent to the printer defining such things as the page resolution, the fonts that are required for the printer to operate, etc. when the job is routed. This is a conventional set of commands. However, this set of commands is modified in order to facilitate the job distribution and handling of the job by the destination devices 1910, these commands being defined by the Destination Queue associated with the PDL generation and input to the job distributor 1904.

Figure 20:
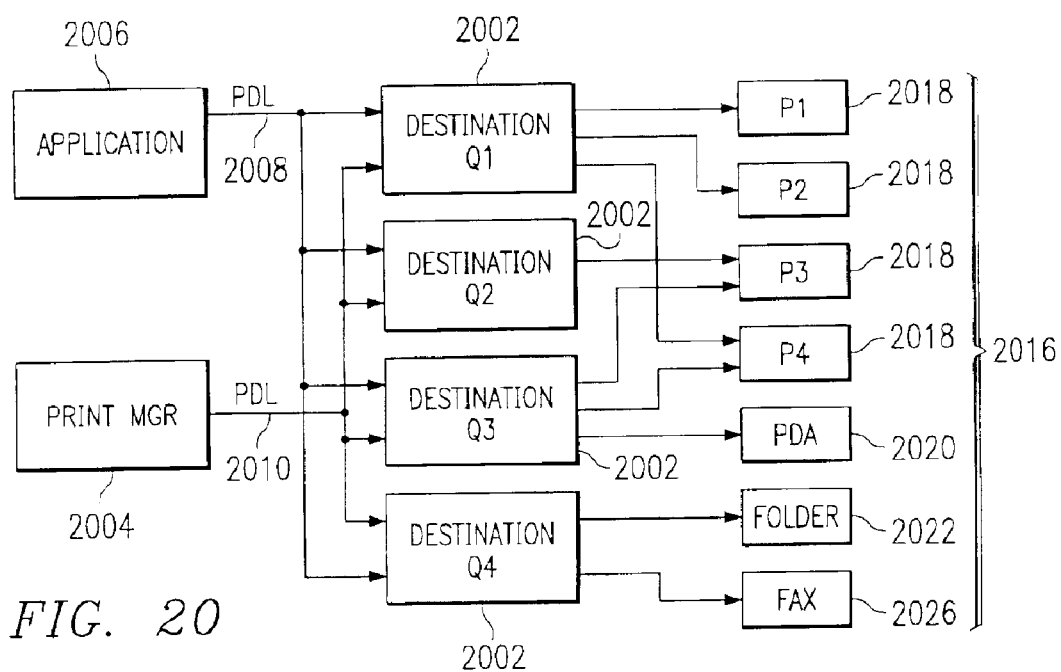
FIG. 20 illustrates a diagrammatic view of the destination queues.

Referring now to FIG. 20 there is illustrated a diagrammatic view of the operation of the job distributor 1904. The job distributor 1904, in the logical flow of a PDL into the Destination Queues and then to the final destinations is illustrated as being input to one of a plurality of Destination Queues 2002, of which there are four Destination Queues 2002 illustrated, labeled Dest Q1, Dest Q2, and Dest Q3, and Dest Q4. Each of the Destination Queues 2002 is operable to receive multiple inputs and provide an interface on multiple outputs. Illustrated as two exemplary inputs are those provided by a print manager 2004 associated with a typical work station computer and an application 2006. There are situations wherein application generate a file that is "wrapped" as a PDL, i.e., the file could be generated and then stored in a Postscript language. Once stored in a Postscript language, this file can be disposed in what is referred to as a "hot folder," which folder is recognized by a Destination Queue as being associated therewith. Each of the Destination Queues may have multiple hot folder inputs associated therewith such that, whenever a file is disposed therein, the Destination Queue will extract the file from that associated folder and process it in accordance with the unique scripting that is associated with the Destination Queue.

In the present embodiment, the system of the present disclosure will accept the following inputs:

Hot Folders;

Windows® Printer Manager Objects

The DQ outputs that are supported are as follows:

e-Mail;

Folder;

FTP (File Transport Protocol)

Printer

Virtual Printer (proprietary protocol described in U.S. Pat. No. 5,859,722), issued Jan. 12, 1999, which is incorporated herein by reference.

The application 2006 is interfaced with the various hot folder inputs to each of the Destination Queues 2002 via interface 2008. Similarly, the print manager 2004 is interfaced with each of the Destination Queues 2002 via an interface 2010. These interfaces are logical interfaces and are merely the ability to output the PDL file to the appropriate Destination Queue 2002. In the case of the print manager 2004, the Destination Queue 2002 is a defined printer in its list of printers and appears to the print manager 2004 as a printer. For example, if the associated Destination Queue 2002 labeled Dest Q1 were defined as a defined printer within the print manager 2004, this Destination Queue 2002 would interface with the printer manager 2004 and exhibit itself as a particular type of printer. This would provide to the print manager 2004 all of the attributes associated with the printer, such as the location of the input/output trays, the type of paper handled thereby, the functionality to allow the print manager to control the number of copies to the printer, etc. However, a system administrator would define exactly how the print job would be handled once received thereby. For example, it might be that a user desired to send a print job to the top tray in an HP8000 printer manufactured by Hewlett Packard®, a conventional network enabled printer. It might be that the Destination Queue 2002 is actually interfaced with such a printer and with other printers. By recognizing that the print job directed to the top tray of a multi-functional HP8000 printer could also be facilitated by another printer on the network, a single tray printer that is much slower and has lower resolution, it might be that the Destination Queue 2002 would route some of this job to that printer for handling thereof.

Each of the Destination Queues 2002 is operable to interface with one or more of a group of destination devices 2016. There are illustrated four printers 2018 labeled P1, P2, P3 and P4. The Destination Queue can also interface with a Personal Digital Assistant (PDA) 2020, with a folder 2022 for storage thereof or even a facsimile machine 2026. In the illustrated embodiment, Dest Q1 is interfaced with printers P1, P2 and P4, Dest Q2 is interfaced with printer P3, Dest Q3 is interfaced with printer P3 and P4 and also with PDA 2020. The Dest Q4 is also interfaced with the folder 2022 and with a facsimile machine 2026. By way of example, Dest Q4 might be a printer definition that is directed to receive the PDL and transfer this PDL to a facsimile machine, a folder, an e-Mail, etc. As another example, Dest Q3 could be scripted such that the job were sent to the available one of the printers P3 or P4 and, once the job was complete, send an image of the first page in the job to the PDA 2020. The PDA 2020 could be one that has a display or the PDA 2020 could be an e-mail receiving device such that an e-mail could be sent by Dest Q3 indicating the completion of the print or even the location of the print job. As will also be described hereinbelow, there is a possibility of sending error messages to an e-mail address, a facsimile or to a system administrator.

Figure 21:
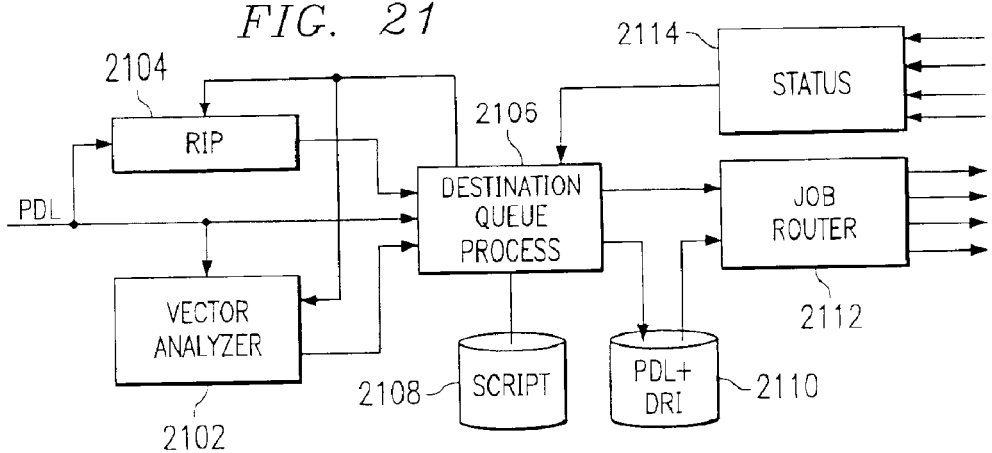
FIG. 21 illustrates a block diagram of the operation for analyzing the PDL document.

Referring now to FIG. 21, there is illustrated a block diagram of the block distributor and the manner by which it handles PDLs. The PDL is first input to a processing section comprised of two parts, a first vector analyzer block 2102 is a block that is operable to operate on the PDL file in its native language, since this is a vector language. One example of this is the well known Postscript language described hereinabove, which is operable to determine certain parameters about the PDL file that are necessary for later processing. These basically define the various printer commands and constitute such things as the user name, the general features of the print job, the various print output settings, etc. However, there are certain aspects associated with the PDL language that cannot be obtained unless the job is actually rasterized, such as extracting a low resolution preview image, or when calculating CMYK coverage. This is facilitated with the RIP engine in the RIP block 2104. However, it is noted that most RIP operations operate at the defined resolution of the document. As the dots per inch (DPI) of the document increase, the amount of processing required to RIP the job increases. The purpose for processing the PDL job through a RIP engine is to obtain such information as the page count, the page size, the toner usage through the coverage of each page and even the coverage on the various color levels of a colored document, this being the CMYK coverage aspect thereof. Further, it is possible, that once RIPPED, a preview of each of one or more select pages, even all pages, can be provided. Therefore, the RIP operation in block 2104 is merely for the purpose of extracting certain information from the PDL file. For operations that only require page size and page count, the file can be processed without rasterizing. As such, the scripting can be defined such that CPU time consuming raster operations are not required.

In order to facilitate the processing speed, the RIP operation is done at a very low resolution, much lower than that normally associated with a job. In the preferred embodiment, this RIP is done at approximately 144 DPI, even though the job may be at 1200 DPI. Once the information is extracted, the RIPPED information is passed back to the system and preview pages may be stored in a spool associated with the Destination Queue.

During the RIP operation, three items of information are extracted, the page count, the page size and the toner coverage levels. In order to extract this information, each page is RIPPED, one at a time, this being a conventional RIP operation. When the page is RIPPED, the pixels are accrued until the end of page command, at which time a counter is incremented for the page count. The page size is then extracted and provided as an output. Additionally, all the pixels accrued for each color plane are then summed and provided as an output for that page. Therefore, each page has associated therewith, after the RIPPING operation, a page size and a pixel count for each plane. Further, when the entire document is RIPPED, then a total page count can be determined for the job.

The analytical results of both the RIP operation and the vector analysis operation are then input to a Destination Queue process block 2106 which also receives the PDL file in its raw format. The PDL file is received in its native form. In this form, the PDL file will have its information and command structure associated therewith. For example, if the PDL file is a Postscript® file, then it will have various commands associated therewith. These commands would define how the job is to be rendered once it goes to the printer. Additionally, a Postscript® file will have contained therein various "comments" which are text lines that are "commented" out. The Destination Queue process block 2106, as will be described hereinbelow, is operable to receive information and assemble attached information to the PDL file for the purpose of further processing in accordance with the script, which is stored in the database 2108. The Destination Queue process 2106 is operable to receive the RIPPED information from the RIP 2104 and also the results of the vector analyzer 2102. In the vector analyzer 2102, the text lines of the PDL file, such as the Postscript® file, are analyzed to extract information therefrom. For example, when the print job is initially created at the application level, certain parameters of the job are selected. For example, the user may determine the number of copies of to be printed, whether it is a duplex job, etc. The type of information that is parsed out of the PDL file prior to RIPping in the present disclosure consists of:

duplex number of copies job name user name date application that created the print file resolution whether the page is to be rotated Although the RIP 2104 and the vector analyzer 2102 are illustrated as being in parallel, in actuality, the system will extract the text information, i.e., review the commented out text, as the PDL file is input into the system. After this information is extracted, the file is then passed to the RIP 2104. At the RIP, the low resolution mode is selected and then the page count is incremented for each page, the page size determined for each page and the toner coverage determined for each page in the form of the CMYK coverage. This provides the coverage for each color plane in a color job, if it is a color job.

The PDL file, after processing through the RIP 2104 and the vector analyzer 2102, has been "evaluated" and can now be routed. However, prior to routing, a text file that is commented out is appended to the end of the PDL file, this being referred to as a DRI file. This is merely textual information. This textual information includes all of the parsed out information parsed out by the vector analyzer 2102 and all of the parsed out RIPPED information parsed out by the RIP 2104. Although a particular script may not require all this information, all this information is collected such that the PDL file does not have to be processed another time. This modified PDL file, modified with a DRI file, is then stored in a PDL database 2110.

When the process block 2106 determines that the job is to be routed or processed, recognizing that a destination printer is available, based upon a predetermined scheduling operation, etc., then the process block 2106 will instruct a job router 2112 to fetch the stored PDL file with its appended DRI command structure and generate a desired command structure for routing to a desired destination device. As noted hereinabove, one example could be a situation wherein a particular PDL was originally required to be printed to a high speed multi-tray printer on a top tray, but due to its unavailability or its failure, the print job would be routed to a single tray low speed printer. To the print manager that originally generated the PDL, in the situation where a work station generated the job, the print job has been sent to the multifunction engine. The Destination Queue process block 2106, however, has the versatility and capability to reroute the job based upon availability, speed considerations, cost considerations, etc.

The manner by which the PDL file is routed is best illustrated utilizing the Postscript® language. In this language, the application typically will generate the PDL file with a plurality of commands. These commands are Postscript® commands and are utilized by the printer during the rendering process to perform such operations as select the correct fonts, select the correct tray, whether it is a duplex operation, etc. These are normally inserted commands that are a function of the print driver in the application program. However, it may be that the job is to be handled differently by the printer as determined by the script. In order to handle the job differently than the application program originally defined it, additional Postscript® commands must be generated and sent to the printer ahead of the PDL file. For example, if the application program directed the entire job of 100 pages to be printed on a single printer, but the Destination Queue determined that this must be printed on three different printers, then commands must be generated. A command would be generated, for example, to print pages 1–20 on printer 1, 21–60 on printer 2 and 61–100 on printer 3. To facilitate this, the entire PDL job is sent with commands preceding it such that the printer will skip the unselected pages. By contrast, if an application program desired to print only pages 1–10 on a printer, it would only send those 10 pages, i.e., the print driver in the application program would reduce the number of pages that were to be printed. As such, in this example, the PDL file would be sent to all three printers. This, of course, will be defined in the script associated with this particular queue. Of course, the queue might not modify the file at all and merely route it to the appropriate printer. Further, if the Destination Queue defined a particular job as going to another tray in the printer, it would only require that certain commands were transmitted that would allow this to happen, i.e., it would instruct the printer to ignore the commands that were in the PDL file as initially generated by the application and generate new commands ahead of the PDL file.

Status information can be retrieved from all or select ones of the destination devices with a status block 2114. This provides status information as to the availability of the printers or destination devices in the network, the progress of a print job routed thereto and the completion thereof. There is an event handler associated with the process block 2106 that will record such events as completion of the job process. The process could be scripted, as described hereinabove, to route the commands to another destination device. This command could be as simple as a page, an e-mail, or even a facsimile output. For example, during the RIP operation in block 2104, a preview of the first page could be output and stored in the database 2110 as a spooled image file of a single page and this then routed to a facsimile machine or to a defined printer or output device. Further, the entire PDL with the appropriate command structure could be routed to the facsimile machine or output device instructing the facsimile machine to only process a single page for output.

Figure 22:
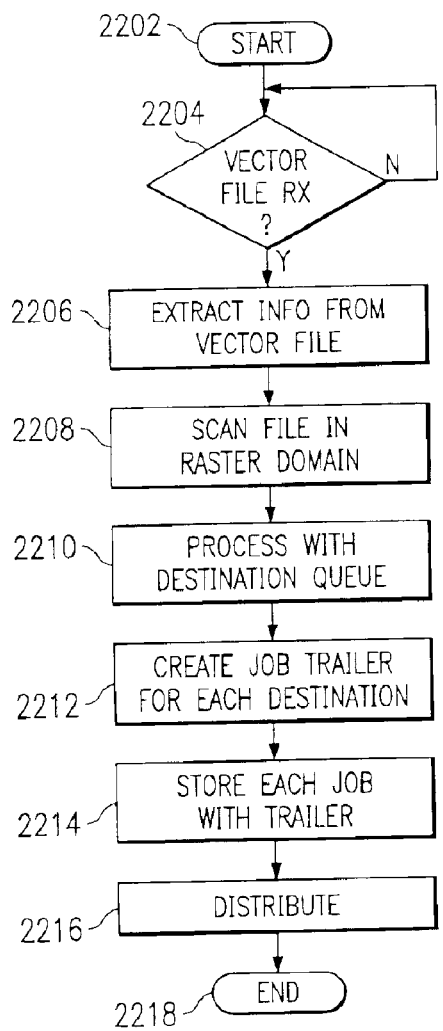
FIG. 22 illustrates a flow chart depicting the operation of analyzing the PDL file.

Referring now to FIG. 22, there is illustrated a flow chart depicting the operation of the extracting operation. The program is initiated at a start block 2202 and then proceeds to a decision block 2204 to determine if a vector file has been received in its native PDL. If so, the program will flow along a "Y" path to a function block 2206 to extract various information from the vector file which, as described hereinabove for a Postscript® file, requires reading of the commented out text lines. The program will then flow to a function block 2208 to scan the file in the raster domain, i.e., with the RIP engine. The RIP engine utilized in the present disclosure is a software RIP engine with the trade name "Ghostscript." Once the information has been extracted from either the vector file in the vector domain or the RIPPED file, the DRI file is then created for each PDL job, as indicated by a function block 2212. The PDL file plus the appended DRI file is then stored, with the DRI file as a "trailer," this indicated by a function block 2214. The program then flows to a function block 2216 to distribute job in accordance with the script of the associated Destination Queue. The program then flows to an End block 2218.

Figure 23:
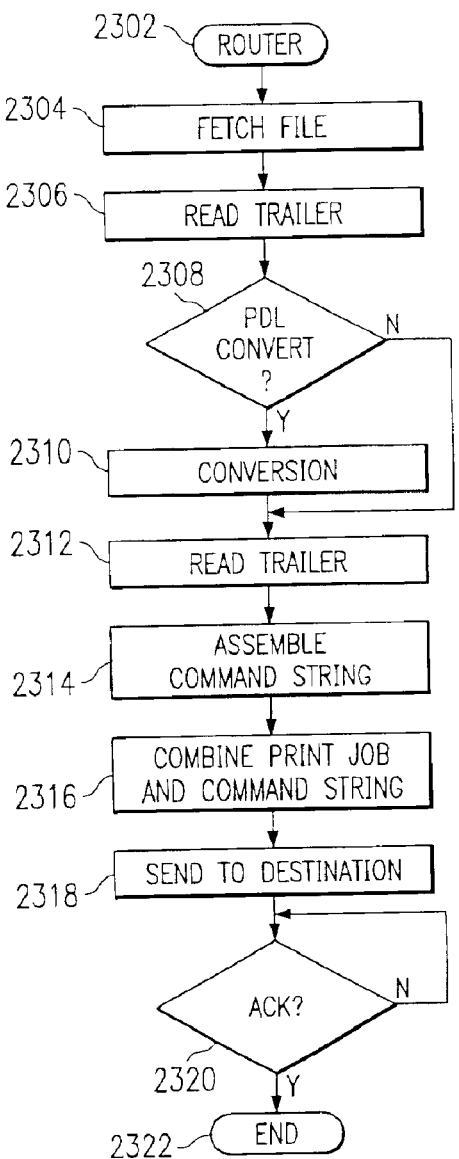
FIG. 23 illustrates a flow chart depicting the operation of routing information with a job router.

Referring now to FIG. 23, there is illustrated a flow chart depicting the operation of the job router, which is initiated at a block 2302 and then proceeds to a block 2304 to fetch the file from the database 2110. The program then flows to a function block 2306 to read the trailer, i.e., the DRI file, and then to determine if a conversion operation is to be performed on the PDL file, as indicated by decision block 2308. As described hereinabove, the PDL file may be translated from one language to the other. For example, it might be that the Destination Queue process determined the output should be in a PDF format as opposed to a Postscript format, which was the format it was received in. This conversion process was described hereinabove. If so, the program will flow along a "Y" path to a function block 2310 to convert the PDL file and, if not, it will then flow along a "N" path. The program will then flow from decision block 2308 or function block 2312 in order to read the trailer. This trailer or DRI file provides the parsed parameters that are required for the execution of the script associated with the Destination Queue be operated on. The Destination Queue will then define what the command string will be for the final assembled and transmitted print job. The program then flows to a function block 2314 to assemble the command string for the stored PDL file for the Destination Queue being operated upon and then flows to a function block 2316 to combine the PDL file and the command string. This combined command string/PDL job is then sent to the destination device, as indicated by a function block 2318 and then the program flows to a decision block 2320 to determine if an acknowledgment has been received, i.e., if the job has been processed as defined by the Destination Queue. This is facilitated with feedback of status signals. However, in some situations, no error signals will be returned, due to the lack of that capability on the destination device. Once acknowledged, the program will flow to an End block 2322.

Figure 24:
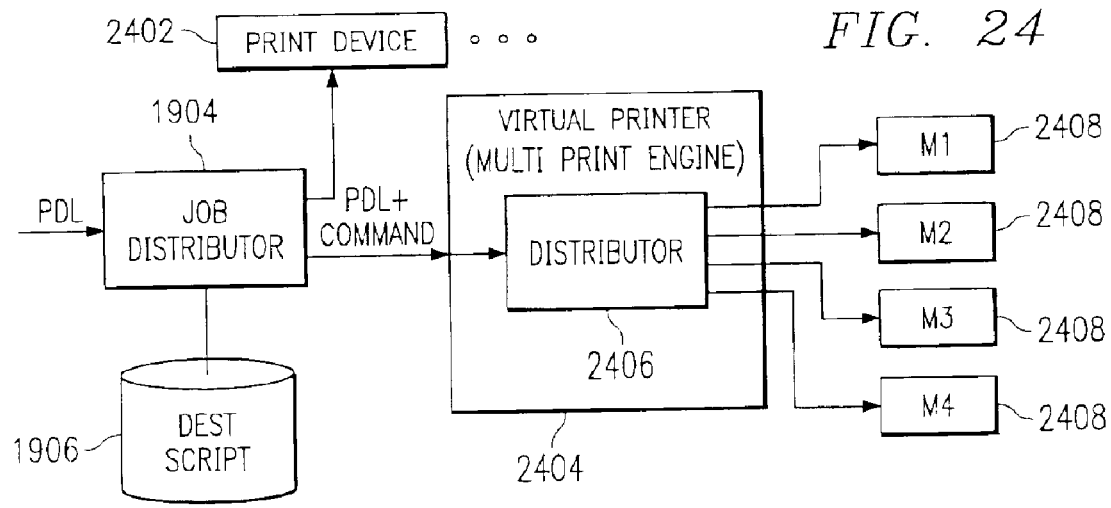
FIG. 24 illustrates a block diagram of the interface of the job distributor with a multi-print engine.

Referring now to FIG. 24, there is illustrated an alternate embodiment wherein the PDL file, after processing within the job distributor 1904 will be sent to either one of a plurality of print devices 2402 or to a virtual print engine 2404. The virtual print engine is described in U.S. Pat. No. 5,859,711, which is incorporated herein by reference, that is essentially a multi-print engine that has associated therewith its own job distributor 2406. This job distributor 2406 is operable to receive the PDL file and its associated command string and RIP the page into its appropriate pages and then route the pages to a plurality of marking engines 2408. The virtual print engine 2404 appears to the job distributor 1904 and the associated Destination Queue as a single printer with a defined set of attributes. The distributor 2406 makes its own decisions as to how to distribute the RIPPED pages to the various marking engines to facilitate completion of the job, independent of the script being run in the job distributor 1904. Although not illustrated, the distributor 2406 has its own associated print manager that would be interfaced to the job distributor 1904.

Figure 25:
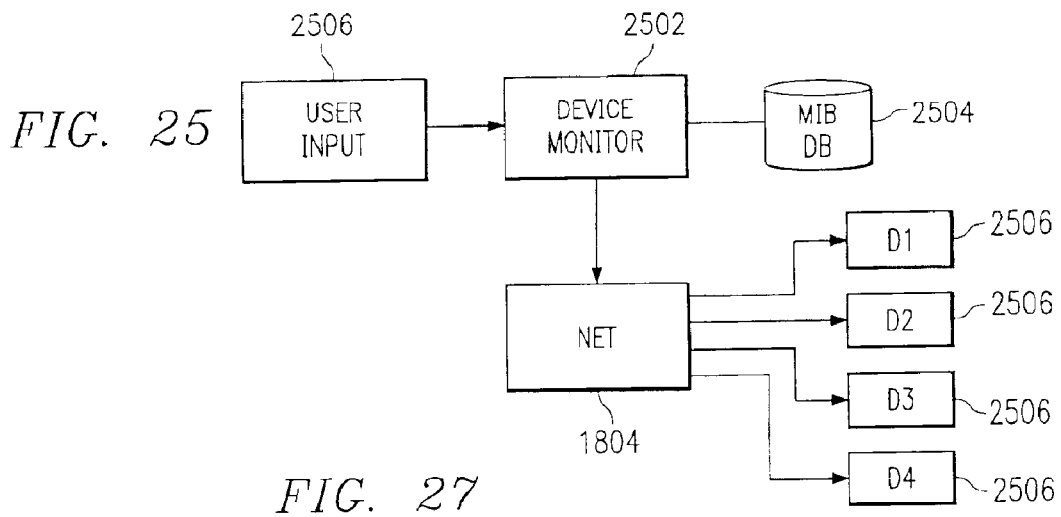
FIG. 25 illustrates a diagram of the discovery operation.

Referring now to FIG. 25, there is illustrated one feature of the job distributor, that of monitoring devices. This is provided with a device monitor node 2502, this node being actually an integral part of the job distributor or print server/distributor block 1820, which interfaces with a Management Information Base (MIB) 2504. An MIB is a database containing ongoing information and statistics on each device in a network, used to keep track of each device's performance and ensure all are functioning properly. A user input 2506 is provided for interfacing with the device monitor, the device monitor node 2502 operable to interface with the network 1804 to interface with various destination devices 2506. Each of the destination devices 2506 has associated therewith a network address.

The monitoring function of the device monitor node 2502 allows it to operate as a tool for monitoring output devices on the network 1804. The system is operable, in the disclosed embodiment, to manage up to 225 output devices on a heterogeneous network. This is an imposed limit that is associated with a class C subnet, although it would be difficult to find this number of devices on a single class C subnet. Multiple class C subnets could be utilized to extend this limit, although it may be more efficient to utilize more than a single job distributer system for large numbers of output devices. As an example of multiple class C subnets on a single system, consider a university environment wherein multiple buildings each have their own class C subnet. A number of printers could be provided on each subnet that could all be shared.

The job distributor has the ability to scan one or more class C subnets and to scan a range within a class C subnet. The ability to range the job distributor from scanning a class C subnet known not to have output devices. It may be that a network administrator only adds printers between xxx.xxx.xxx.50 and xxx.xxx.xxx.98, with all other addresses designated for other computer equipment. This defines the "printer" range. A user can determine the state of the printers at a glance through the user interface and monitor the use of the printers and the consumables of the printers, i.e., the toner levels, from a single application. Although illustrated as a direct connection between the user input device 2506, this user interface could be facilitated, and is the preferred method in the disclosed embodiment, through the network 1804 from an external work station (not shown). The device monitor node 2502 can be configured to alert operations in certain situations, such as when a job occurs and does not print correctly, or even when the job is completed. Notification methods would include sound notification, error messages and e-mail. There are user definable triggers and notifications for various events. The status operation is facilitated between the device monitor node 2502 and the various connected printers (connected being defined as the presence of a destination printer within the group in the MIB database 2504) through the use of SNMP calls. In one embodiment, the MIB database 2504 contains the majority of the information that describes the destination device or printer such as input/output trays, emulations, paper sizes, input/output tray status, cover status, toner levels, etc. Another portion of the MIB database 2504 can be dedicated to host resources that provide the device monitor node 2502 with the current status of the print engine and also provides various aspects as to a printer discovery process, which will be described hereinbelow.

Figure 26:
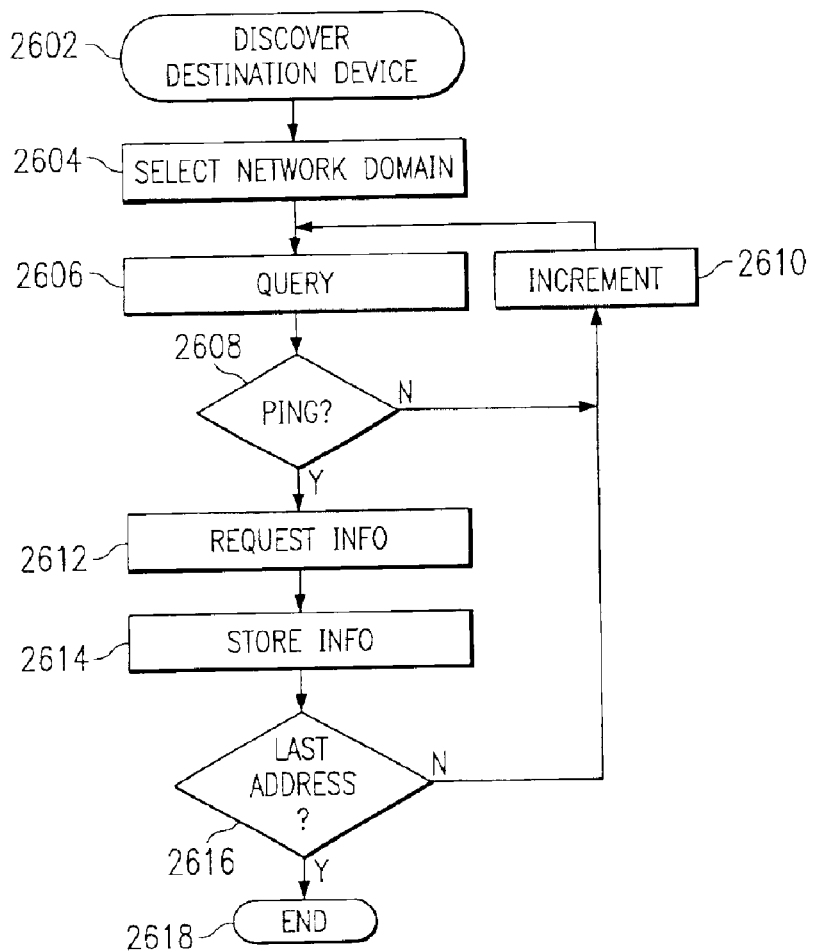
FIG. 26 illustrates a flow chart of the discovery operation.

Referring now to FIG. 26, there is illustrated a flow chart depicting the discovery operation for discovering destination devices on the network that can be brought into the "managed devices" associated with the operation of the distribution system disclosed herein. The program is initiated at a block 2602 and then proceeds to a block 2604 wherein a network domain is selected. In this particular flow chart, an automatic operation is performed wherein the system works within a Class C network domain. This is a network domain that has a network address xxx.xxx.xxx.xxx, with the last field having a value of from one to 254. A valid IP address for a Class C domain would be, therefore, between one to 254. As such, the discovery process has the potential to return 255 printers with a single Class C network domain. By selecting one particular network domain, there can be provided in that domain 255 printers. The program will flow to a function block 2606 after selecting the network domain to query the various IP addresses to determine if they are printers that can be added to the domain. In order for the printer to be added to the domain, they must have associated therewith a Print MIB object (prtInputDescription). This MIB object is very specific to the printer and is checked because some Windows® systems try to look like a printer, but do not fully support the MIB specification. Thus, the MIB object is used as a "gatekeeper" to handle any further SNMP requests. When a device on the network has associated therewith the Print MIB object, this will be a situation wherein that device has a defined client/server relationship. There will be a client program (called the network manager) that makes virtual connections to a server program (called the SNMP agent), which executes on a remote network device, and serves information to the manager regarding the device's status. An SNMP Management Information Base (MIB) is provided that defines a standard set of statistical and control values for the destination device. The SNMP additionally allows the extension of the standard values with the values specific to a particular agent through the use of private MIBs, also known as "enterprise MIBs." The query will be in the form of a ping which is sent out to the network device at the select address. The system waits for a "ping" response. A ping is defined by RFC-792, and utilizes very few bytes and most, if not all, devices on a network will answer a ping request. The system then attempts to make sure that a device is located at the "select" address before asking it any SNMP questions. If a device is found, i.e., it answers the "ping" request, then the system requests all of the prtInputDescription from the device. If an answer is received, then this is suspected to be a printer and more queries are generated. If the system does not recognize a printer at this address, as defined by a decision block 2608, the program will proceed to a function block 2610 to increment the address and then send another query. If the ping is successful, then the program will flow to the function block 2612 to request information from the MIB objects, which is stored in its SNMP and then the information will be returned. This return of information will let the discovery application know what type of device it is and then, once the discovery process is finished, it will return a table to the calling routine with the following information:

IP address of the printer
    MAC address of the printer
    Printer description
    Printer enterprise number
    Number of marker colors
    HRDeviceStatus
    HRPrinterStatus
    HRPrinterDetectedErrorState
    Supported emulations This information is provided for both a printer that is associated with a "Destination Queue" group and also printers that function only for the purpose of monitoring operations, i.e., they are not able to be controlled. This information will then be stored, as indicated by a block 2614 and then possibly displayed to the user such that the user can select which of the printers they wish to keep. The program then proceeds to a decision block 2616 to determine if this is the last address in the domain. If not, the program will flow to function block 2612 to increment the address and then to the query block 2606. At the last address, the program will end at a block 2618.

Figure 27:
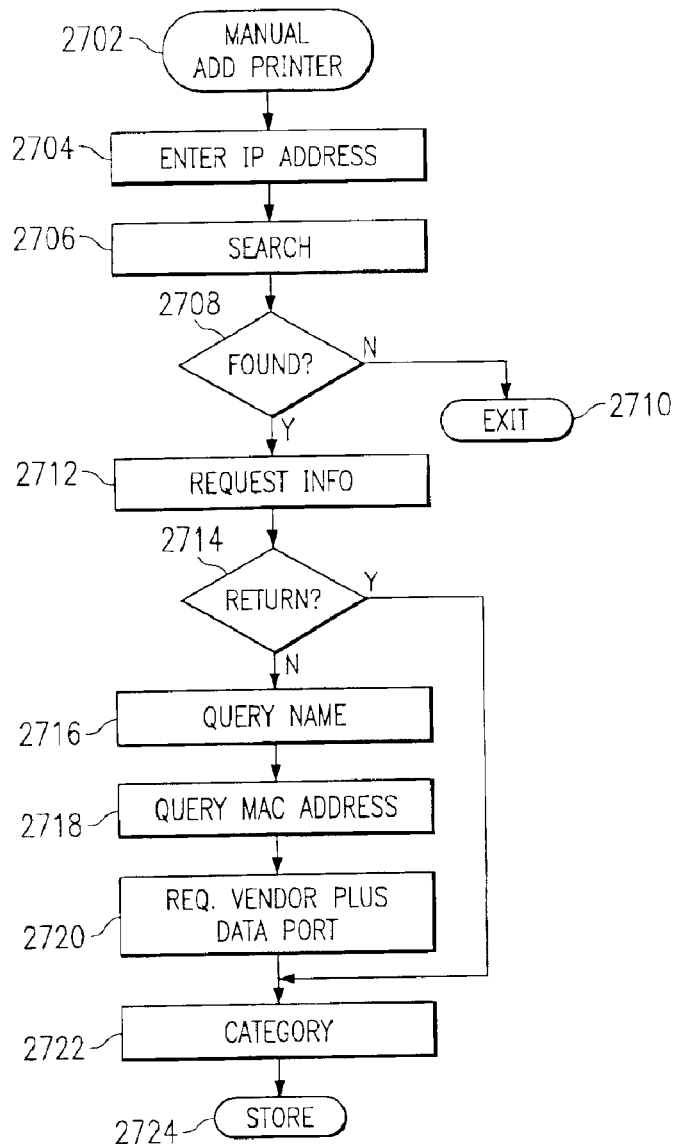
FIG. 27 illustrates a flow chart for the manual addition of a printer.

Referring now to FIG. 27, there is illustrated a flow chart for the manual addition of the printer, which is initiated at a block 2702 and then proceeds to a block 2704 to enter an IP address. The program then will flow to a function block 2706 to search the network for that IP address, i.e., it will ping the address. If nothing is found at the address, as determined by a decision block 2708, the program will exit at a block 2710. If a device is found at the network address, the program will flow to a function block 2712 to request the MIB object prtInputDescription, i.e., to determine if the device is a printer that has a Print MIB object associated therewith. This is determined by a decision block 2714. At this block, the following steps would occur:

Enter IP address
    Ping the IP address
    Ping response OK?
    If so:
        Ask SNMP questions
    else:
        Inform user and manual entry
    prtInputDescription acceptable?
    If so, more SNMP queries
    Is it a printer?
    If so:
        add to database
    else:
        inform user and manual entry If it must be manually defined, the program will flow to a function block 2716 to query for the name and then to a function block 2718 to query for the MAC address, then to a function block 2720 to request the vendor and data port. By entering the MAC address of the printer, this constitutes the actual address of the printers NIC card, with the vendor being provided from an available list to the user and then the data port can be selected to define the various port numbers and the associated data format that is associated with that port number. These are standard port definitions.

If the information is found or if it is entered manually, the program will then flow to a function block 2722 to define the category for the printer. This printer will be defined in multiple categories. One category, for example, is color, one is associated with production printers and one is associated with managed printers. There can be other categories associated with the printers, these being categories that will be associated with the scripting operation for the Destination Queues. The program will then flow to a function block 2724 to store the information, this typically being a step wherein the summary of the printer to be added to the management group of destination printers can be provided to the user.

Figure 28:
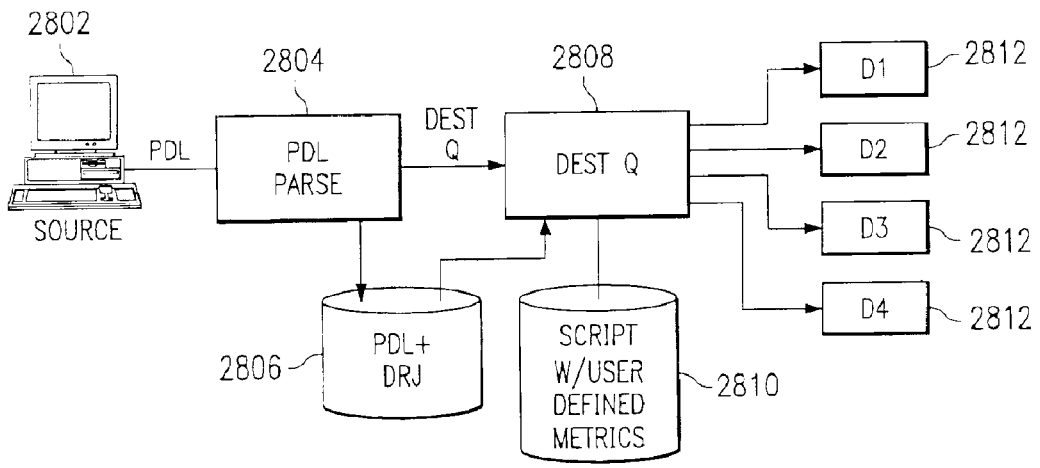
FIGS. 28 and 29 illustrate simplified examples of the job distributer.

Referring now to FIG. 28, there is illustrated a simplified diagrammatic view of the job distributer operation. A source application program device 2802 is illustrated, such as a user PC, that is operable to generate a PDL for routing and output on one or more than one destination device 2812. The PDL is routed first to a PDL parsing device 2804 to parse from the PDL file the desired information from both the vector domain and from the raster domain, this providing the parameters of the PDL as defined in the application device 2802 during the creation of the PDL. The parsing device is associated with a defined destination queue. The information from the parsed PDL file is then appended to the PDL and the combination stored in a database 2806. A destination queue 2808 is then selected as a result of the routing operation of the PDL to the PDL parsing device, which destination queue has a defined purpose to route the PDL to one of a plurality of destination devices 2812. Typically, the application program is operable to define the destination queue to which the PDL is directed.

The destination queue is operable to run a predetermined script stored in a script file 2810, which is a programmatic algorithm that defines certain if-then operations that are parameterized on the parsed information from the PDL file. The destination queue need only examine the DRI file appended to the PDL file in order to achieve this parameterization. This will provide one or more conditional branches that can be taken when routing the PDL file. For example, suppose that a print job were routed to a courier destination queue that defined this print job as one that had to be handled in a expeditious manner. The destination queue could then determine which printer was available on an immediate basis and which of the available printers was the closest to the mail room. The print job would then be sent to the printer and then a notification sent vie E-Mail to the mail room clerk that a job was ready at a specific printer. The destination queue could even include a preview of the first page to the clerk. As such, the use of a programmatic algorithm parameterized upon information in the original PDL file will allow multiple routing decisions to be made. These decisions can be a function of user defined metrics, such as cost, time constraints, etc. For example, there may be a trade off between toner cost and speed. One destination queue may be an economy queue and will always select the one of the printers having the lowest cost per page. With knowledge of the amount of toner that will be used, a decision can be made between various available printers. If turnaround is paramount, a priority queue may be provided that will select the fastest printer as the output device. The decision is all based upon the metrics defined in the script associated with the queue. Further, decisions can be made as to the availability of the printer for the job. If a printer has a low toner level for a particular job, this would render this printer as unavailable for a priority job.

In another aspect of the system, there is a monitoring mode whereby the system may actually monitor the status of the printers and then send an E-Mail that there is one or more printers down or that the toner level is low. A technician can then be dispatched with the appropriate equipment. This may be advantageous in that a technique going to a certain location to replace a toner cartridge may wan information as to other proximately disposed printers that may have low toner levels that are still sufficient for printing, but are close to empty. This may save a future trip.

Figure 29:
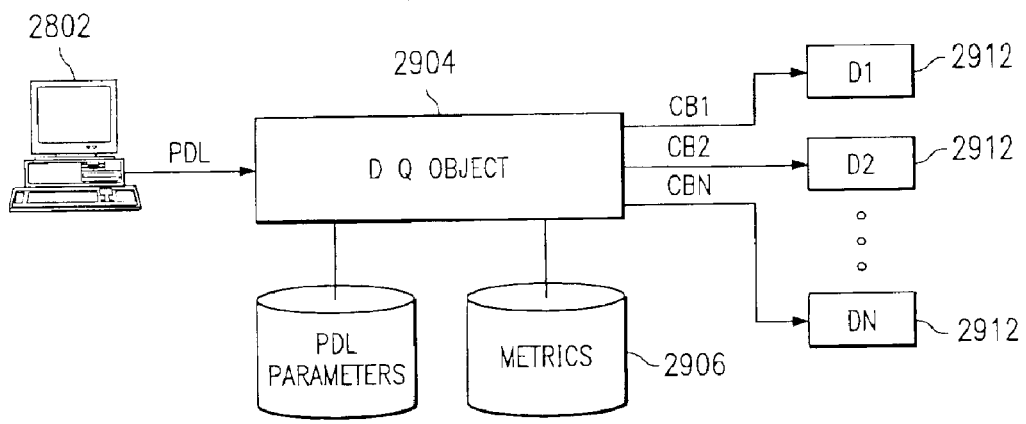

Referring now to FIG. 29, there is illustrated a simplified diagram of the conditional branching operation. The source directs the PDL file to defined DQ object 2904. This is typically provide for as an icon in the Print Manager of the application program wherein the job distributor is set up as a printer on the application device. To the application device 2802, the job distributor appears as a predefined printer that has selectable parameters associated therewith to allow the user to parameterize the print job with such things as number of copies, duplex operation, resolution, paper trays, paper type, etc. The icon will function just as any other print icon as far as the user is concerned. This allows the job distributor to take on a virtual printer persona.

The DQ object 2904 is operable to select one of multiple Conditional Branches CB1, CB2, . . . , CBN which are branches to associated ones of the destination devices 2812. These Conditional Branches are parameterized upon the parameters parsed from the PDL file and user defined metrics. These metrics, as described hereinabove, can be any type of tangible goal, such as determining the available one of the printers or an intangible goal such as cost factors, time, etc.

Although the preferred embodiment has been described in detail, it should be understood that various changes, substitutions and alterations can be made therein without departing from the spirit and scope of the invention as defined by the appended claims.

This listing of claims will replace all prior versions, and listings, of claims in the application:

1. A method for processing print jobs, comprising the steps of:
generating a print job at an application node of a network and having print parameters associated therewith;
routing the print job to a distribution node on the network;
parsing the parameters from the generated print job;
parameterizing the print job with predetermined metrics that are a function of at least one of the parsed parameters; and
routing the parameterized print job to a destination device on a destination node on the network.

2. The method of claim 1, wherein the step of routing is associated with a defined process.

3. The method of claim 2, wherein the metrics are associated with the defined process.

4. The method of claim 1, wherein the print job is defined in a Printer Description Language (PDL) as a PDL file.

5. The method of claim 4, wherein the step of parsing is operable to parse information from the PDL file without rasterizing the PDL file.

6. The method of claim 5, wherein the step of parsing further comprises ripping the PDL file to determine additional information therefrom.

7. The method of claim 4, wherein the PDL file is combined with the parsed information and stored in a database.

8. The method of claim 1, wherein the predetermined metrics comprise conditional branches that are parameterized upon the at least one of the parsed parameters.

9. The method of claim 8, wherein there are provided a plurality of destination device on the network, and the step of routing operable to rout to one or more of the destination devices.

10. A method for high speed distribution, in a network print system, of a PDL file to one or more destination devices, comprising the steps of:

inputting respectively to first, second and third inputs of a destination queue processor the PDL file, the PDL file following conversion in a raster image processor (RIP) engine and the PDL file following analysis in a vector analyzer;

processing in the destination queue processor, the PDL file provided at the first input thereof, the ripped PDL file provided at the second input thereof and the vector analyzed PDL file provided at the third input thereof to provide a job file stored in each of one or more destination queues associated with respective destination devices wherein each job file stored in a destination queue has appended thereto a new command structure configured as a job trailer defining further processing of the stored job file at the associated respective destination device; and extracting for each destination device the job file and its appended job trailer, under the control of a job router coupled to the output of the destination queue processor, for distribution to the one or more destination devices.

11. The method of claim 10, wherein the step of inputting comprises the steps of:

inputting the PDL file, having printable content and printing parameters embedded therein, via parallel paths to the first input of the destination queue processor, to an input to a RIP engine and to an input to a vector analyzer.

12. The method of claim 11, wherein the step of inputting the PDL file further comprises the step of:

ripping the PDL file in the RIP engine to extract the printing parameters therefrom for coupling to the destination queue processor via a second input.

13. The method of claim 11, wherein the step of inputting the PDL file further comprises the step of:

analyzing the PDL file in the vector analyzer to extract a set of command vectors therefrom for coupling to the destination queue processor via a third input.

14. The method of claim 10, further comprising the step of:

distributing each extracted job file with its appended job trailer to the corresponding one destination device.

15. The method of claim 11, wherein the step of inputting a PDL file via parallel paths further comprises the step of:

applying the PDL file to a common bus coupled to the first input of the destination queue processor and to the respective inputs of the RIP engine and the vector analyzer.

16. The method of claim 12, wherein the step of ripping the PDL file applied to the RIP engine comprises the steps of:

ripping the PDL file at high speed and at a resolution substantially lower than the resolution of the input PDL file; and discarding the ripped file following extraction of the print parameters therefrom.

17. The method of claim 13, wherein the step of analyzing the PDL file comprises the steps of:

reading the input PDL file; and discarding the PDL file following extraction of the command vectors for controlling a destination device from the PDL file.

18. The method of claim 10, wherein the step of processing comprises the steps of:

defining in the destination queue processor a process script for the PDL file for each destination according to the command vectors extracted from the PDL file and corresponding to the associated destination queue;

creating a job trailer defining the required processing at the select destination according to the process script for each destination device corresponding to a destination queue; and storing each job file to which is appended the associated job trailer for subsequent distribution to a destination device.

19. The method of claim 18, wherein the step of defining further comprises the step of:

receiving a status indication from a destination device associated with the destination queue.

20. The method of claim 10, wherein the step of extracting comprises the steps of:

retrieving a designated job file with its appended job trailer from the destination queue; and distributing the designated job file with its appended job trailer to a corresponding destination.

21. The method of claim 10, wherein a destination device comprises:

one or more devices selected from the group consisting of a printing device, a display device, a transmitting device, a network interface, a storage device, a server and a work station.

22. A method for high speed distribution in a network print system, of a PDL file for printing, transmission or display to one or more destination devices, comprising the steps of:

inputting a PDL file, having printable content and printing parameters embedded therein, via parallel paths to a first input of a destination queue processor, to an input to a RIP engine and to an input to a vector analyzer;

ripping the PDL file in the RIP engine to extract the printing parameters therefrom for coupling to the destination queue processor via a second input;

analyzing the PDL file in the vector analyzer to extract a set of command vectors therefrom for coupling to the destination queue processor via a third input;

processing in the destination queue processor, the PDL file provided at the first input thereof, the ripped PDL file provided at the second input thereof and the vector analyzed PDL file provided at the third input thereof to provide a job file stored in each of one or more destination queues associated with respective destination devices wherein each job file stored in a destination queue has appended thereto a new command structure configured as a job trailer defining further processing of the stored job file at the associated respective destination device; and extracting for each destination device the job file and its appended job trailer, under the control of a job router coupled to the output of the destination queue processor, for distribution to the one or more destination devices.

23. The method of claim 22, further comprising the step of:

distributing each extracted job file with its appended job trailer to the corresponding one destination device.

24. The method of claim 22, wherein the step of inputting a PDL file via parallel paths comprises the step of:

applying the PDL file to a common bus coupled to the first input of the destination queue processor and to the respective inputs of the RIP engine and the vector analyzer.

25. The method of claim 22, wherein the step of ripping the PDL file applied to the RIP engine comprises the steps of:

ripping the PDL file at high speed and at a resolution substantially lower than the resolution of the input PDL file; and discarding the ripped file following extraction of the print parameters therefrom.

26. The method of claim 22, wherein the step of analyzing the PDL file comprises the steps of:

reading the input PDL file; and discarding the PDL file following extracting of the command vectors for controlling a destination device from the PDL file.

27. The method of claim 22, wherein the step of processing comprises the steps of:

defining in the destination queue processor a process script for the PDL file for each destination according to the command vectors extracted from the PDL file and corresponding to the associated destination queue;

creating a job trailer defining the required processing at the select destination according to the process script for each destination device corresponding to a destination queue; and storing each job file to which is appended the associated job trailer for subsequent distribution to a destination device.

28. The method of claim 27, wherein the step of defining further comprises the step of:

receiving a status indication from a destination device associated with the destination queue.

29. The method of claim 22, wherein the step of extracting comprises the steps of:

retrieving a designated job file with its appended job trailer from the destination queue; and distributing the designated job file with its appended job trailer to a corresponding destination.

30. The method of claim 22, wherein a destination device comprises:

one or more devices selected from the group consisting of a printing device, a display device, a transmitting device, a network interface, a storage device, a server and a work station.

31. A system for managing print operations, comprising:

a print server/distributor coupled to a network of print devices and operable to receive PDL print jobs from each of a plurality of application nodes coupled to said network for processing including modification of the manner in which said PDL print jobs are printed and distributing each said print job or portion thereof as modified to a selected one of more of said plurality of print devices; and a PDL print job database coupled to said print server/distributor for storing said PDL print jobs upon receipt and following said modification pending routing of each said PDL print job or portion thereof.

32. The system of claim 31, wherein said print server/distributor is coupled to said network of print devices via a network interface connection.

33. The system of claim 32, wherein said network interface connection is via a wired medium.

34. The system of claim 32, wherein said network interface connection is via a wireless medium.

35. The system of claim 31, wherein said print server/distributor comprises:

one or a plurality of destination queues, each respectively associated with one of said plurality of print devices, wherein each said destination queue defines the manner in which each said PDL print job is processed for distribution to a corresponding print device and modified, for printing by said corresponding device.

36. The system of claim 35, wherein said destination queue comprises:

a process for providing a script in association with a corresponding PDL print job, said script including a set of commands to be executed by a print device which script may be modified by said process responsive to print device status information provided by a device status database compiled from status outputs from said plurality of print devices.

* * * * *